(12) United States Patent
Rohana et al.

(10) Patent No.: US 8,499,123 B1
(45) Date of Patent: *Jul. 30, 2013

(54) MULTI-STAGE PIPELINE FOR CACHE ACCESS

(75) Inventors: Tarek Rohana, Haifa (IL); Gil Stoler, Nofit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/357,787

(22) Filed: Jan. 25, 2012

Related U.S. Application Data

(63) Continuation of application No. 12/506,805, filed on Jul. 21, 2009, now Pat. No. 8,117,395, which is a continuation-in-part of application No. 12/491,025, filed on Jun. 24, 2009.

(60) Provisional application No. 61/082,379, filed on Jul. 21, 2008, provisional application No. 61/083,310, filed on Jul. 24, 2008, provisional application No. 61/083,319, filed on Jul. 24, 2008, provisional application No. 61/075,590, filed on Jun. 25, 2008.

(51) Int. Cl.
*G06F 13/00* (2006.01)

(52) U.S. Cl.
USPC .................. 711/128; 711/140; 711/145

(58) Field of Classification Search
USPC .......................................... 711/128, 140, 145
See application file for complete search history.

(56) References Cited

U.S. PATENT DOCUMENTS

| | | | |
|---|---|---|---|
| 6,434,665 B1 * | 8/2002 | Shepherd et al. | 711/118 |
| 6,606,686 B1 | 8/2003 | Agarwala et al. | |
| 6,961,824 B2 | 11/2005 | Rowlands et al. | |
| 7,290,116 B1 * | 10/2007 | Grohoski et al. | 711/216 |
| 7,509,484 B1 * | 3/2009 | Golla et al. | 712/225 |
| 8,145,870 B2 * | 3/2012 | Dunshea et al. | 711/170 |
| 8,200,949 B1 * | 6/2012 | Tarjan et al. | 712/225 |
| 2001/0049771 A1 | 12/2001 | Tischler et al. | |
| 2002/0144078 A1 * | 10/2002 | Topham et al. | 711/203 |
| 2005/0091457 A1 | 4/2005 | Auld et al. | |
| 2006/0004995 A1 * | 1/2006 | Hetherington et al. | 712/235 |

OTHER PUBLICATIONS

U.S. Appl. No. 12/506,805, filed Jul. 21, 2009, Tarek Rohana and Gil Stoler, "Multi-Stage Pipeline for Cache Access", 52 pages.

* cited by examiner

*Primary Examiner* — Reba I Elmore

(57) ABSTRACT

Embodiments of the present disclosure provide a command processing pipeline operatively coupled to an N-way cache and configured to process a sequence of cache commands. A way of the N ways of the cache with which an address of a cache command matches is a hit way for the cache command in case the cache command is a hit. In one embodiment, the command processing pipeline may be configured to receive a first cache command from one of the plurality of processing cores, select a way, from the N ways, as a potential eviction way, and generate, based at least in part on the received first cache command, N selection signals corresponding to the N ways, wherein each selection signal is indicative of whether the corresponding way is (A). the hit way and/or the eviction way, or (B). neither the hit way nor the eviction way.

21 Claims, 11 Drawing Sheets

200

| Command / Pipe Stage | Stage 1 | Stage 2 | Stage 3 | Stage 4 | Stage 5 |
|---|---|---|---|---|---|
| Read Hit | Tag, Valid and Dirty indication Lookup (read) | Tag Result match calculation, Read access to Data and ECC memory | Data and ECC memory sampling for timing reasons | ECC check calculation | ECC correction |
| Write Hit | Tag, Valid and Dirty indication Lookup (read) | Tag Result match calculation, Write access to Data and ECC memory ECC Generation | | | |
| Line Fill Update | Tag, Valid and Dirty memory Write | Write access to Data and ECC memory. ECC Generation | | | |
| Read Miss | Tag, Valid and Dirty indication Lookup (read) | Tag Result miss calculation, Read access to Data and ECC memory | Data and ECC memory sampling for timing reasons; Valid memory Write | ECC check calculation | ECC correction |
| Write Miss | Tag, Valid and Dirty indication Lookup (read) | Tag Result miss calculation. | | | |
| Snoop Clean Hit | Tag, Valid and Dirty indication Lookup (read) | Tag Result match calculation, Read access to Data and ECC memory | Data and ECC memory sampling for timing reasons; Dirty memory write | ECC check calculation | ECC correction |
| Snoop Invalidate Hit | Tag, Valid and Dirty indication Lookup (read) | Tag Result match calculation. | Valid memory write | | |
| Snoop Clean & Invalidate Hit | Tag, Valid and Dirty indication Lookup (read) | Tag Result match calculation, Read access to Data and ECC memory | Data and ECC memory sampling for timing reasons; Valid / Dirty memory Write | ECC check calculation | ECC correction |
| Snoop Miss | Tag, Valid and Dirty indication Lookup (read) | Tag Result miss calculation. | | | |

Fig. 2

MULTI-STAGE PIPELINE FOR CACHE ACCESS

CROSS REFERENCE TO RELATED APPLICATIONS

The present application is a continuation of U.S. application Ser. No. 12/506,805 filed Jul. 21, 2009, entitled "MULTI-STAGE PIPELINE FOR CACHE ACCESS," which claims priority to U.S. Patent Application No. 61/083,310 filed Jul. 24, 2008, entitled "SMP Shared L2 Cache—Method for Read After Read Pipeline Optimization," to U.S. Patent Application No. 61/083,319 filed Jul. 24, 2008, entitled "SMP Shared L2 Cache: Method for Write After Read Pipeline Optimization," to U.S. Patent Application No. 61/082,379 filed Jul. 21, 2008, entitled "SMP Shared L2 Cache—Method for Data RAM Way Access Improvement," and is a continuation-in-part of U.S. patent application Ser. No. 12/491,025 filed Jun. 24, 2009, entitled "Multi-Stage Pipeline for Cache Access," which claims priority to U.S. Patent Application No. 61/075,590 filed Jun. 25, 2008, entitled "SMP Shared L2 Cache Optimized Pipeline," the entire specifications of which are hereby incorporated by reference in their entireties for all purposes, except for those sections, if any, that are inconsistent with this specification.

TECHNICAL FIELD

Embodiments of the present invention relate to caches, and more particularly, to multi-stage pipelines for cache access.

BACKGROUND

A cache is a memory bank that bridges main memory and a processing core, and is used to speed up data transfers and instruction execution. The cache is usually faster than main memory and allows instructions to be executed and data to be read and written at relatively higher speed. A suitable type of random access memory (RAM) (e.g., a static RAM or SRAM) may be used as a cache.

A second level cache may be shared among two or more processing cores and may include different classes of storage areas (referred henceforth as cache resources) for storing different types of information that is related to data or instructions, e.g., tag memory, dirty memory, valid memory, data memory, error correcting code (ECC) memory, etc. A cache is usually also associated with one or more other elements (also referred henceforth as cache resources) that are used, for example, for generating, checking, and/or correcting error correcting codes associated with data stored in the cache, e.g., ECC check module, ECC correcting module, ECC generation module, etc. A cache may handle many different types of cache commands (e.g., read access command, write access commands, snoop commands, etc.), which access the cache to read data from and/or to write data to the cache.

Processing a cache command may require access to one or more of the cache resources. However, in a shared cache environment access to the one or more cache resources may be limited to a single processing core until a cache command has been resolved. For example, if a tag memory of a cache is being accessed by a first processing core for processing a first cache command, the tag memory may not be accessed by a different processing core (or by the same processing core) for processing a different cache command until resolution of the first cache command (or at least a part of the first cache command). This may be a limiting factor in achieving higher speed of a cache, particularly when the cache is shared by two or more processing cores.

A cache command may either be a hit or a miss. For example, a cache command may include data associated with an address of an external memory. If data associated with the address resides within the cache and is valid (e.g., is in synchronization with an external memory), the command is a hit. On the other hand, if data associated with the address does not reside within the cache and/or is dirty (e.g., is not in synchronization with an external memory), the command is a miss. If a cache command is a miss, one or more data bytes from the cache may need to be evicted to make space for new data to be fetched from the external memory (e.g., data associated with the cache command is to be fetched from the external memory). In a conventional cache, determining whether a cache command is a hit or a miss, and accessing data from or writing data to the cache (in case the cache command is a hit) or accessing data from the cache for eviction (in case the cache command is a hit) is usually time consuming. For example, start of processing of a cache command may not commence in a conventional cache until a hit/miss determination of a previous command is made, and/or until processing of the previous command is fully (or at least partially) completed.

SUMMARY

In an embodiment, the present disclosure provides an apparatus and a method for operating a multi-staged command processing pipeline for shared access to a second level cache. More specifically, there is provided, in accordance with an embodiment of the present invention, a system on chip (SOC) comprising a plurality of processing cores, a shared N-way cache configured to be accessed by one or more of the plurality of processing cores, a command processing pipeline operatively coupled to the N-way cache and configured to process a sequence of cache commands, and wherein individual cache commands are either a hit or a miss, wherein a way of the N ways of the cache with which an address of a cache command matches is a hit way for the cache command in case the cache command is a hit. In one embodiment, the command processing pipeline may comprise a first command processing stage configured to receive a first cache command from one of the plurality of processing cores, select a way, from the N ways, as a potential eviction way, from which data is to be evicted in case the first cache command is a miss, and generate, based at least in part on the received first cache command, N selection signals corresponding to the N ways, wherein each selection signal is indicative of whether the corresponding way is (A). the hit way and/or the eviction way, or (B). neither the hit way nor the eviction way.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 2 includes a table that illustrates processing sequences for various example cache commands by the command processing stages of the command processing pipeline of FIG. 1, in accordance with an embodiment of the present invention;

DETAILED DESCRIPTION OF EMBODIMENTS OF THE INVENTION

As previously noted, a cache may be shared among two or more processing cores and may include one or more resources for storing different types of information that is related to data or instructions, e.g., tag memory, dirty memory, valid memory, data memory, ECC memory, etc. The tag memory (sometimes referred as tag random access memory, tag RAM, in case the cache is a RAM) is a part of the cache that may store addresses of data currently stored in each cache line. The values stored in the tag memory may determine whether a cache lookup results in a hit or a miss. The actual data may be stored in data memory (also referred as data RAM, in case the cache is a RAM), which may also be a part of the cache. The dirty memory (also referred to as dirty RAM, in case the cache is a RAM) may be used to identify data in the cache that is "dirty," i.e., has been recently modified and/or is not currently in synchronization with the main memory. The valid memory (also referred to as valid RAM, in case the cache is a RAM) may be used to identify the data in the cache that is currently valid (e.g., is currently in synchronization with the main memory). An ECC memory may be used to store error correcting codes associated with data stored in the cache.

A cache may also be associated with one or more other resources (e.g., ECC check module, ECC correcting module, ECC generation module, etc.), which, for example, may be a part of the cache and/or a control circuit (e.g., a cache controller) configured to control the cache. An ECC check module may be a part of a cache controller that may be configured, for example, to perform an ECC check on data associated with the cache. An ECC correcting module may be a part of a cache controller that may be configured, for example, to correct any error in the data (e.g., data that is to be written to or read from the cache) based on checking an error correcting code. An ECC generation module may be configured, for example, to generate error correcting codes while writing data in the cache.

Figure 1:
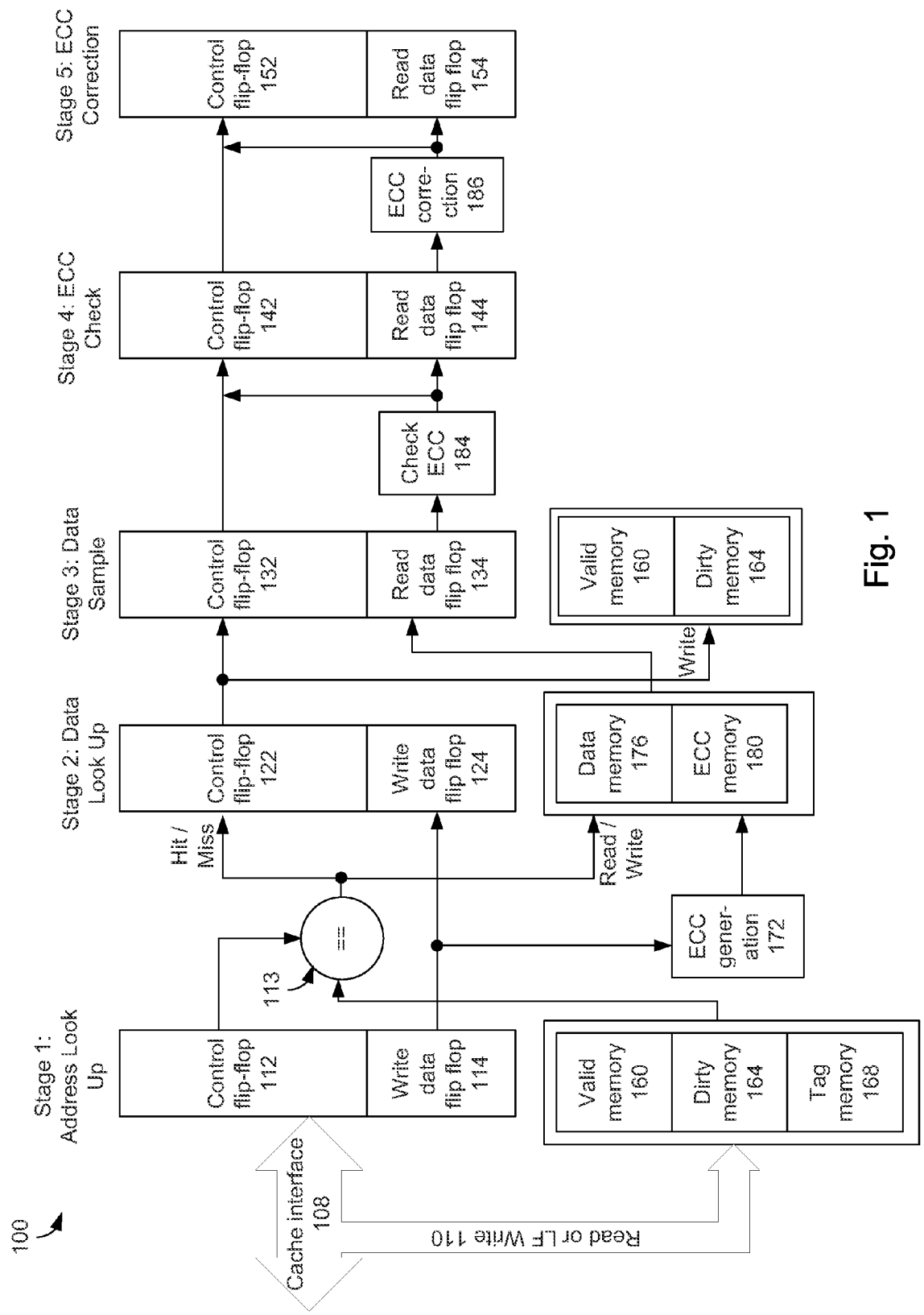
FIG. 1 schematically illustrates an example command processing pipeline 100 that is configured to be operatively coupled to a cache, in accordance with an embodiment of the present invention.

FIG. 1 schematically illustrates an example command processing pipeline 100 that is configured to be operatively coupled to a cache, in accordance with an embodiment of the present invention. Although the cache is not illustrated as a separate entity in FIG. 1, one or more resources associated with the cache are illustrated in the figure, as discussed in more detail below. In an embodiment, the cache may be a second level cache, e.g., an L2 cache. In an embodiment, the cache may be a shared cache, that is to say, one or more processing cores may have shared access to the cache. In an embodiment, one or more processors may have shared access to the cache through the command processing pipeline 100 (henceforth also referred to as "pipeline 100").

In an embodiment, the pipeline 100 may be used to process one or more cache commands received from one or more processors and/or other elements (e.g., memory controller and/or one or more processes) that may have access to the cache. For example, the pipeline 100 may process one or more cache commands, such as a read command, a write command, a line fill command, a snoop clean command, a snoop invalidate command, a snoop clean and invalidate command, and/or the like.

In an embodiment, the pipeline 100 may have a plurality of command processing stages (henceforth also referred to as "stages"), each stage associated with one or more resources of the cache. The individual command processing stages may access the associated one or more cache resources while processing a cache command (henceforth also referred to as a "command"). In an embodiment, no two consecutive stages may be associated with or have access to the same cache resource. For example, the first command processing stage may be associated with valid memory 160, dirty memory 164, and/or tag memory 168, whereas the second command processing stage may be associated with data memory 176, ECC memory 180, and/or an ECC generation module 172. Thus, the first and second command processing stages may have access to mutually exclusive groups of cache resources. The third command processing stage may be associated with valid memory 160 and/or dirty memory 164. Thus, the second and third command processing stages may be associated with and have access to mutually exclusive groups of cache resources. However, as seen in FIG. 1, the first stage and the third stage are not consecutive and both may access same cache resources.

A cache command received by the pipeline 100 may either be a "hit" or a "miss," as previously discussed. For example, a cache command, received by the pipeline 100, may store data associated with an address of an external memory. The pipeline 100 may check to see whether data associated with the address is stored in the cache and is valid (by, for example, comparing the address with information stored in valid memory 160, dirty memory 164, and/or tag memory 168, as will be explained in more detail herein). If data associated with the address is stored in the cache and is valid, the cache command is considered to be a "hit." On the other hand, if data associated with the address is not stored in the cache and/or is not valid, the cache command is considered to be a "miss." Thus, for example, a read command received by the pipeline 100 may either be a hit (henceforth referred as read hit command) or a miss (henceforth referred as read hit command).

Similarly, a write command received by the pipeline 100 may either be a hit (e.g., a write hit command) or a miss (e.g., a write miss command). When the pipeline 100 receives a cache command, the first stage performs an address lookup, and the second stage determines whether the cache command is a hit or a miss (based on the results of the address lookup), as will be discussed in more detail herein later.

The pipeline 100 may receive one or more cache commands over the cache interface 108. In an embodiment, each cache command may be sequentially processed by one or more of the command processing stages of the pipeline 100, and individual command processing stages may take one clock cycle each to process a cache command. Different commands may be processed by a different number of stages. For example, a read hit command may be sequentially processed by all five of the command processing stages, while a line fill update command (used to update the cache with new data in case a previous command is a read miss or a write miss, as is well known to those skilled in the art) may be sequentially processed, for example, by the first two of the five command processing stages only, as discussed in more detail below. Thus, the read hit command may be processed in five clock cycles, whereas the line fill update command may be processed in two clock cycles. In an embodiment, the processing of individual cache commands may be at least partially independent of the processing of other cache commands, as discussed in more details below.

When a cache command is received by the pipeline 100, the cache command may have an associated address (e.g., address of a main memory that includes data cached by the cache). Upon receiving the cache command, the pipeline 100 may compare the associated address to determine if data associated with the address is currently cached or stored in the cache, and if the data is valid data or dirty data. This may be done by performing an address lookup, e.g., by comparing the cache command address with information stored in the tag memory 168, valid memory 160 and/or dirty memory 164. Accordingly, in an embodiment, the first stage of the pipeline 100 may be an address lookup stage, which may have access to valid memory 160, dirty memory 164, and/or tag memory 168. The first stage may include a control flip-flop 112 and a write data flip flop 114, and may be configured to receive one or more cache commands and perform address lookup by comparing (the comparison operation is illustrated by block 113 in FIG. 1) addresses associated with the cache commands with information stored in the valid memory 160, dirty memory 164, and/or tag memory 168. The result of the comparison may indicate whether individual cache commands are hit or miss, and further processing of individual commands may be based on the comparison results.

In an embodiment, the second stage may be a data lookup stage, which may have read access and/or write access to various resources of the cache, e.g., data memory 176, ECC memory 180, and/or ECC generation module 172. In an embodiment, the data lookup stage may either lookup data from or write data to the data memory 176 and/or the ECC memory 180. The second stage may include a control flip flop 122 and a write data flip flop 124. The second stage may be configured to receive the cache commands processed by the first stage, and to process the received cache commands. In an embodiment, the second stage may generate an ECC code (e.g., using the ECC generation module 172, which may generate error correcting codes for data to be written to the cache in case the cache command is a write command). The second stage may also be configured to provide a cache command an access to read from and/or write to the data memory 176 and/or ECC memory 180, based at least in part of the type of cache command being processed by the second stage.

In an embodiment, the third stage may be a data sampling stage, which may have access to, for example, valid memory 160 and dirty memory 164. The third stage may be configured, for example, to sample data read from the cache (e.g., data read from data memory 176 and ECC memory 180 during the second stage), and/or to write data in the valid memory 160 and/or dirty memory 164. The third stage may include a control flip flop 132 and a read data flip flop 134.

In an embodiment, the fourth and fifth stages may be ECC check stage and ECC correcting stage, respectively. The fourth stage may have access to a check ECC module 184, and may include a control flip flop 142 and a read data flip flop 144. The fourth stage may be configured to check an error correcting code using, for example, the check ECC module 184. In case of an ECC error, the fifth or ECC correcting stage may correct the ECC error using an ECC correcting module 186. Thus, the fifth stage may have access to the ECC correcting module 186.

FIG. 2 includes a table 200 that illustrates processing sequences for various example cache commands by the command processing stages of the command processing pipeline 100 of FIG. 1, in accordance with an embodiment of the present invention. Individual rows of table 200 illustrate respective commands and how the commands are processed by one or more of the five command processing stages of the pipeline 100.

For example, once a read command is received by the first stage over the cache interface 108, the address associated with the read command may be looked up in the tag memory 168 (to perform tag lookup to determine if data is stored in the cache), valid memory 160 and/or dirty memory 164 (to determine if the data is valid or dirty), to determine if the command is a hit or miss. The first row of table 100 is associated with the situation where the read command is a hit (e.g., a read hit command), whereas the fourth row of the table 100 is associated with the situation where the read command is a miss (e.g., a read miss command). Referring to the first row of table 200, the second stage of the pipeline performs the tag result match calculation using the address look up information from the first stage, and upon deciding that the read command is a hit, provides read access to data memory 176 and/or ECC memory 180 (so that data may be read from the data memory 176 and/or ECC memory 180). In an embodiment, once read access has been provided in stage 2, ECC check and ECC correcting (if necessary or desired) may be directly performed by the fourth and fifth stage, respectively. However, for timing reasons (e.g., to ensure that the read hit command does not bypass the third stage), in another embodiment, the read data from the data memory 176 and/or ECC memory 180 may be sampled by the third stage. The fourth stage may perform an ECC check using the check ECC module 184, and if desired, ECC correction may be performed by the fifth module using the ECC correcting module 186.

Processing of several other cache commands are also illustrated in table 200. For example, the second row illustrates how the pipeline 100 may process a write command if the write command is a hit (e.g., if the address associated with the write command is located in the tag memory 168 and if the associated data in the cache is valid, as indicated by the valid memory 160). The processing of various cache commands, as illustrated in table 200, may be readily understood by those skilled in the art based on the teachings provided herein, and hence, detailed discussion of some of the cache commands in table 200 has been omitted for the sake of brevity.

As previously noted, in an embodiment, the pipeline may be configured such that none of any two consecutive stages in the pipeline access the same cache resources. For example, referring again to FIG. 1, the first stage may access the tag memory 168, valid memory 160 and/or dirty memory 164 while processing a cache command, whereas the second stage may access the data memory 176 and the ECC memory 180 while processing another cache command. That is, the first and second stages may not access the same resources, but rather the first and second stages access different (e.g., mutually exclusive) cache resources. Accordingly, there may not be any conflict in simultaneously accessing respectively resources by the first and second stages, while processing two different cache commands by the two stages. Thus, while the second stage is processing a first cache command (and possibly accessing the data memory 176 and the ECC memory 180 for such processing), the first stage may simultaneously intake a new (e.g., a second) cache command and process the second cache command by accessing the tag memory 168, valid memory 160 and/or dirty memory 164. That is, the pipeline 100 may be configured to sequentially (e.g., in two consecutive clock cycles) receive the first and second cache commands, and the second stage may be configured to process the first cache command (after the first cache command has been processed by the first stage) substantially simultaneously (e.g., during a same clock cycle) with the second cache command being processed by the first stage.

Similarly, as the second and third stage access different cache resources, the third stage may receive and process the first cache command substantially simultaneously (e.g., during the same clock cycle) with the second command being processed by the second stage.

Thus, the pipeline 100 may receive and start processing a second cache command in a given clock cycle, even if the pipeline 100 received and started processing a first cache command during an immediately previous clock cycle, irrespective of the result of the address lookup of the first command performed by the first stage (e.g., irrespective of whether the first command is a hit or a miss).

In comparison, when two (e.g., a first and a second) cache commands are to be processed sequentially in a conventional cache, the second command has to wait to be processed until the first command is processed. For example, in a conventional cache, an address lookup is performed for the first command to determine a hit or a miss, and based on the address lookup, subsequent processing of the first command is performed. The start of processing of the second command, in a conventional cache, may start only after completion of the first command. At the least, the start of processing of the second command, in a conventional cache, may depend on the address lookup and comparison results of the first command, to avoid any conflict in accessing one or more resources while simultaneously processing both the first and second commands. However, as previously discussed, as any two consecutive stages the pipeline 100 access different cache resources, a second command may enter the pipeline immediately after (e.g., in the next clock cycle) the first command has entered the pipeline 100, irrespective of the address lookup or compare results (e.g., the result of the address look up to determine a hit or a miss) of the first command. In an embodiment, such sequential and seamless processing of the cache commands may significantly speed up the access speed of the cache.

In an embodiment, some of the cache commands may be broken down to make those commands compatible with the pipeline 100. For example, a line fill update command (third row of table 200) may be issued when a cache miss indication is asserted, and may be used to write data in a pre-allocated entry in the cache, as is well known to those skilled in the art. A line fill update command may not usually require an address lookup or comparison with a tag memory, a valid memory or a dirty memory, and the command may be executed by directly having write access in the data and ECC memories in a single stage or a single clock cycle. However, such direct access (e.g., by bypassing the first stage of the pipeline 100) may create resource conflict with other cache commands. For example, the line fill update command may try to access the data memory simultaneously with a previous cache command (that entered the pipeline in the immediately previous cycle) also accessing the data memory at the same time. To avoid such conflict and to make the line fill update command compatible with the pipeline 100, in an embodiment, processing of the line fill update command may be broken down in two stages (see table 200): the first stage may perform an address lookup of the line fill update command (even though such lookup may not be necessary for the command), and the second stage may provide write access to the data memory 176 and/or ECC memory 180. Breaking down the line fill update command in two stages many increase the number of clock cycles (e.g., one clock cycle) used to complete the command, but such breaking down may ensure that the command is not a blocking command (i.e., does not block entry of new commands in the pipeline while the current command is being processed by one of the stages), thereby ensuring smooth operation of the pipeline 100. Additionally, as the line fill update is a relatively time insensitive command (e.g., compared to a read hit command), an increase of one clock cycle processing time may not have any significant adverse effect.

Similarly, a read miss command (see row four of table 200) may have read access to data memory 176 and/or ECC memory 180, and have write access to valid memory during a single clock cycle. However, to make a read miss command compatible with the pipeline 200 (and to ensure that no consecutive stages of the pipeline 100 has access to the same resource), the write access to the valid memory 160 may be given to the read miss command in the third stage (instead of the second stage), as illustrated in the fourth row of table 200. Although this may increase the processing time of the read miss command by one clock cycle, such an increase may not be significant given that a read miss command is a relatively time insensitive command (e.g., compared to a read hit command), and such an increase may be necessary for smooth operation of the pipeline 200.

The third stage of the pipeline 100 may have write access to the valid memory 160 and/or dirty memory 164 for processing some of the cache commands, e.g., read miss command, some of the snoop commands, etc., as illustrated in the third column of table 200. While the third stage accesses the valid memory 160 and/or dirty memory 164 for processing one or more of these commands, no new command may be allowed to enter the pipeline 100. This is because, if any new command enters the pipeline, the first stage of the pipeline may try to access the valid memory 160 and/or dirty memory 164 to process the new command while the third stage may also be simultaneously accessing one or more of these cache resources, thereby creating access conflict for these cache resources. Thus, these commands may be blocking the pipeline (e.g., preventing new command from entering the pipeline) while being processed by the third stage. However, the number of blocking commands is relatively small, and these commands block entry of new commands when processed by only one of the five stages. Accordingly, the degradation of access speed because of such blocking may not be significant compared to improvement of speed achieved using the pipeline 100, as previously discussed. Also, in a relatively large sized cache, the probability of a hit is relatively large and high rate cache commands (e.g., those commands that usually occur relatively more frequently, like read hit, write hit, etc.) may pass through the pipeline 100 without blocking entry of any new cache command in the pipeline 100.

Figure 3:
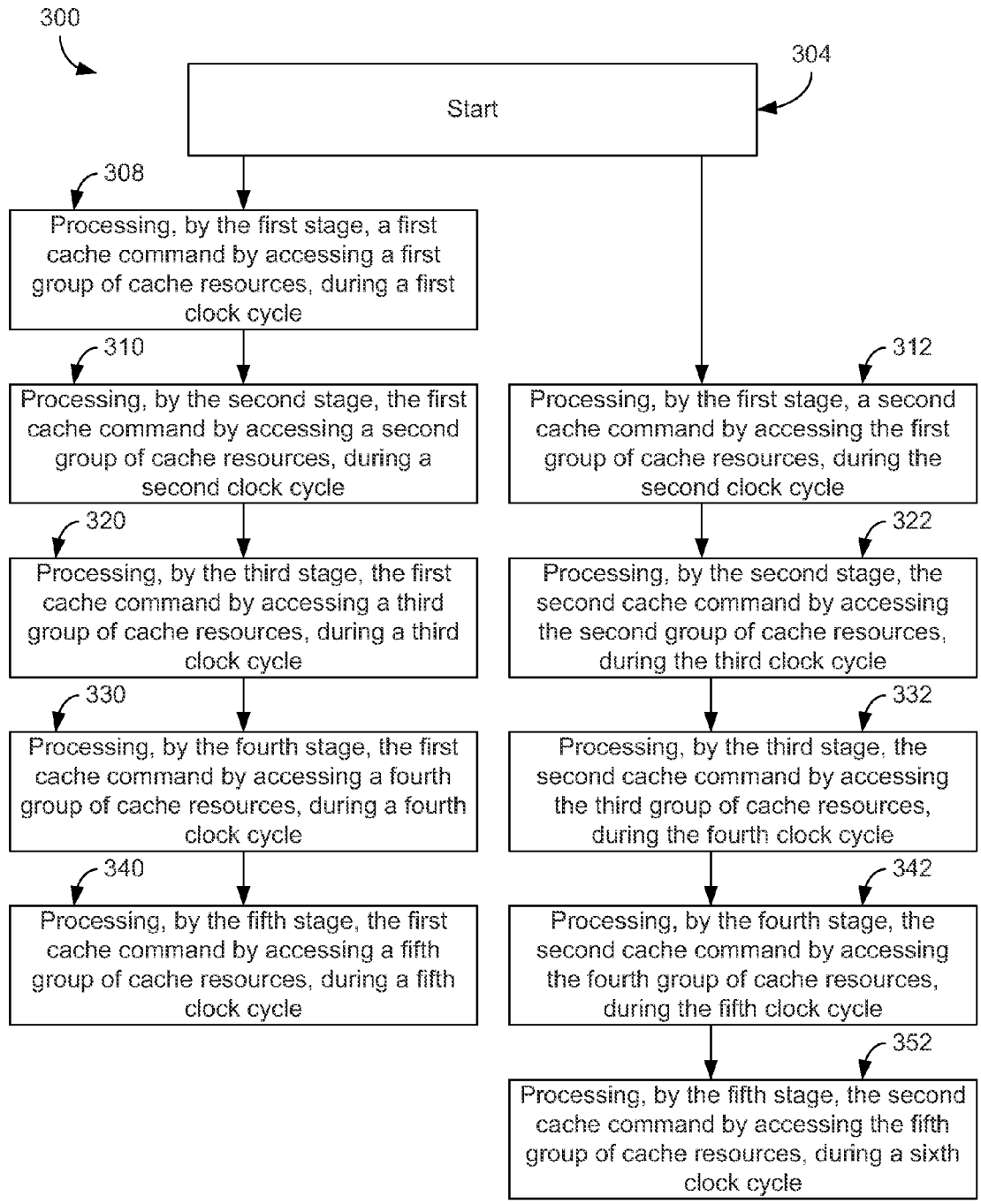
FIG. 3 illustrates an example method of operating the command processing pipeline of FIG. 1, in accordance with an embodiment of the present invention.

FIG. 3 illustrates an example method 300 of operating the command processing pipeline 100 of FIG. 1, in accordance with an embodiment of the present invention. The method starts at block 304. The cache commands that are processed, and their respective data, may be from the same processing core, or from different processing cores that share a cache. At block 308, the method 300 includes processing, by the first stage, a first cache command by accessing a first group of cache resources, during a first clock cycle. As previously discussed, the first group of cache resources may include valid memory 160, dirty memory 164 and/or tag memory 168.

In an embodiment, the method 300 may further include, at block 310, processing, by the second stage, the first cache command (that has already been processed by the first stage at block 308) by accessing a second group of cache resources, during a second clock cycle. As previously discussed, the second group of cache resources may include data memory 176, ECC memory 180 and/or ECC generation module 172. Thus, the resources included in the second group of cache resources may be different from the resources included in the first group of cache resources.

The method 300 may further include, at block 312, processing, by the first stage, a second cache command by accessing the first group of cache resources, during the second clock cycle. Thus, the operations in blocks 310 and 312 may be performed substantially simultaneously, e.g., during the same (e.g., second) clock cycle.

The method 300 may further include, at block 320, processing, by the third stage, the first cache command (that has already been processed by the second stage at block 310) by accessing a third group of cache resources, during a third clock cycle. As previously discussed, the third group of cache resources may include valid memory 160 and/or dirty memory 164. Thus, the resources included in the second group of cache resources may be different from the resources included in the third group of cache resources.

The method 300 may further include, at block 322, processing, by the second stage, the second cache command (that has already been processed by the first stage at block 312) by accessing the second group of cache resources, during the third clock cycle. Thus, the operations in blocks 320 and 322 may be performed substantially simultaneously, e.g., during the same (e.g., third) clock cycle.

The method 300 may further include, at block 330, processing, by the fourth stage, the first cache command (that has already been processed by the third stage at block 320) by accessing a fourth group of cache resources, during a fourth clock cycle. As previously discussed, the fourth group of cache resources may include ECC check module 184, for example. Thus, the resources included in the third group of cache resources may be different from the resources included in the fourth group of cache resources.

The method 300 may further include, at block 332, processing, by the third stage, the second cache command (that has already been processed by the second stage at block 322) by accessing the third group of cache resources, during the fourth clock cycle. Thus, the operations in blocks 330 and 332 may be performed substantially simultaneously, e.g., during the same (e.g., fourth) clock cycle.

The method 300 may further include, at block 340, processing, by the fifth stage, the first cache command (that has already been processed by the fourth stage at block 330) by accessing a fifth group of cache resources, during a fifth clock cycle. As previously discussed, the fifth group of cache resources may include ECC correcting module 186. Thus, the resources included in the fourth group of cache resources may be different from the resources included in the fifth group of cache resources.

The method 300 may further include, at block 342, processing, by the fourth stage, the second cache command (that has already been processed by the third stage at block 332) by accessing the fourth group of cache resources, during the fifth clock cycle. Thus, the operations in blocks 340 and 342 may be performed substantially simultaneously, e.g., during the same (e.g., fifth) clock cycle.

The method 300 may further include, at block 352, processing, by the fifth stage, the second cache command by accessing the fifth group of cache resources, during a sixth clock cycle (that has already been processed by the fourth stage at block 342).

In an embodiment, the first, second, third, fourth, fifth and sixth clock cycles, during which operations are performed, may be consecutive clock cycles of a clock signal.

FIG. 3 illustrates processing of both the first and second cache commands by all the five stages of the pipeline 100. However, not all cache commands may be required to be processed by all the five stages. For example, as may be noted from FIG. 2, a write miss command may be processed by only the first two stages of the pipeline 100, as illustrated in table 100. Similarly, a snoop invalidate hit command may be processed by only the first three stages of the pipeline 100. Accordingly, based at least in part on the type of the cache command, the method 300 of FIG. 3 may be truncated earlier than block 340 and/or block 352.

As illustrated in FIG. 3, the first stage is configured to process the second cache command before full resolution of the first cache command by the pipeline 100. For example, the first stage is configured to process the second cache command before completion of processing of the first cache command by various stages of the pipeline 100. In accordance with an embodiment, arrangement of the processing pipeline, as seen in FIG. 1, is configured such that processing of a second cache command can commence on the next cycle after an address of a first command is compared against a corresponding address in one or more of the valid memory 160, dirty memory 164 and the tag memory 168 to determine a hit/miss.

It is noted that processing may proceed in a similar pipelined manner such that processing on a third cache command (not shown) may also proceed once the second command advances through pipeline 100, for example reaches stage 2, and/or before the processing of the second command is fully completed.

Pipeline with Eviction Buffer

Figure 4:
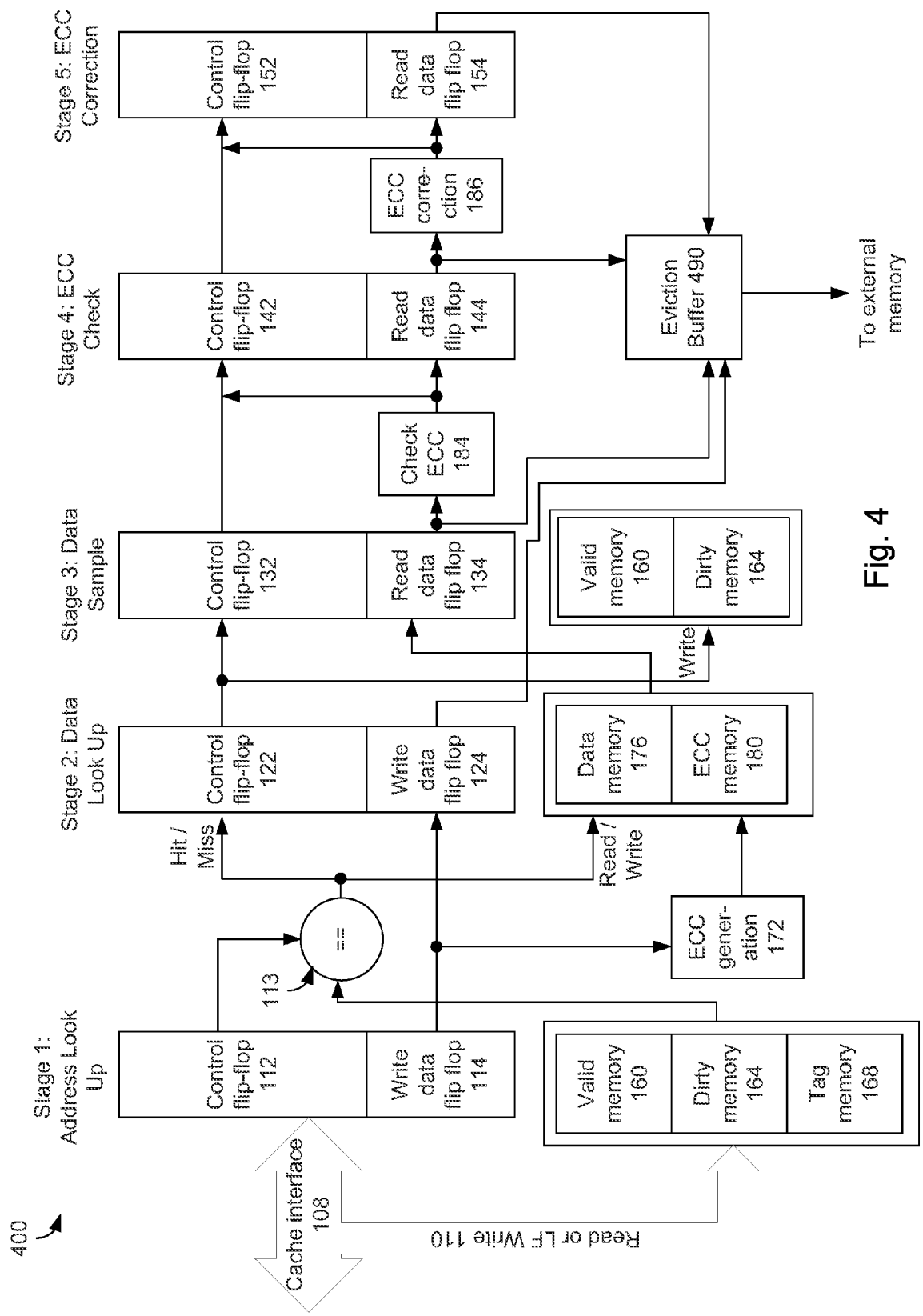
FIG. 4 schematically illustrates another example command processing pipeline that is configured to be operatively coupled to a cache, in accordance with an embodiment of the present invention.

FIG. 4 schematically illustrates another example command processing pipeline 400 that is configured to be operatively coupled to a cache, in accordance with an embodiment of the present invention. Two sets of cache data, and their respective cache commands that are processed by pipeline 400, may be from the same processing core, or from different processing cores that share a cache. Several components of the pipeline 400 of FIG. 4 may be at least in part similar to the corresponding components of the pipeline 100 of FIG. 1, and these components in both FIGS. 1 and 4 have been identified using the same identification labels.

In addition to the components identified in FIG. 1, the pipeline 400 of FIG. 4 may include an eviction buffer 490. In an embodiment, the eviction buffer 490 may receive input from one or more stages of the pipeline 400, including, for example, from the output of stages 2, 3, 4 and/or 5. The eviction buffer 490 may also be operatively coupled to one or more external memories with which the cache is synchronized (e.g., from which the cache may read data and/or to which the cache may write data). In an embodiment, the cache and the associated pipeline 400 may be configured to update the external memory (e.g., write data to the external memory) through the eviction buffer 490, as will be explained in more detail herein.

Write After Read Command Pipelining

As previously discussed, when a read command enters a command processing pipeline (e.g., pipeline 400 of FIG. 4), the first stage of the pipeline may perform an address lookup (e.g., by comparing an address associated with the read command with data stored in the tag, valid and/or dirty memory) to determine if the command is a hit or a miss. If the read command is a miss command (e.g., a read miss command), in an embodiment, the pipeline 400 may need to evict one or more bits of data from cache. Once the one or more bits of data is evicted from the cache, the cache may fetch, from an external memory, data associated with the address that was included in the read miss command, and store the same in the area from which one or more bits of data was evicted. That is, the data eviction, in response to the read miss command, may be performed to make space for fetching new data (e.g., data which was intended to be read by the Read miss command) from the external memory. In an embodiment, eviction of one or more bits of data may be performed in conjunction with updating the valid memory to indicate that the one or more bits of data has been evicted (i.e., the one or more bits of evicted data is no longer valid), checking the eviction data for any ECC error, and writing the eviction data to the external memory.

Thus, processing a read miss command may include performing an address lookup (to determine if the command is a miss), choosing an eviction address (e.g., choosing one or more bits of data to be evicted from the cache), updating the valid memory to indicate the invalidity of the eviction data, checking the eviction data for possible ECC errors (if, for example, an ECC correction condition is set), and writing the eviction data to the external memory. Subsequently, the cache may fetch, using a separate cache command (e.g., a line fill update command), new data (e.g., data which was intended to be read by the Read command) from the external memory.

In an embodiment, while processing a read miss command, once the cache has selected an eviction address (e.g., chosen one or more bits of data to be evicted from the cache), the cache may take some time (e.g., one cycle) to invalidate the address of the eviction data in the valid memory, so that subsequent cache commands associated with the eviction data may indicate a miss. However, there may be situations where a cache command (e.g., a write command) associated with the address of the eviction data enters the pipeline before the eviction address is invalidated. This may result in a hit for the write command, even though the eviction data is going to be evicted (but not yet evicted) to the external memory within the next few cycles, thereby creating chances of conflict in the cache.

Figure 5:
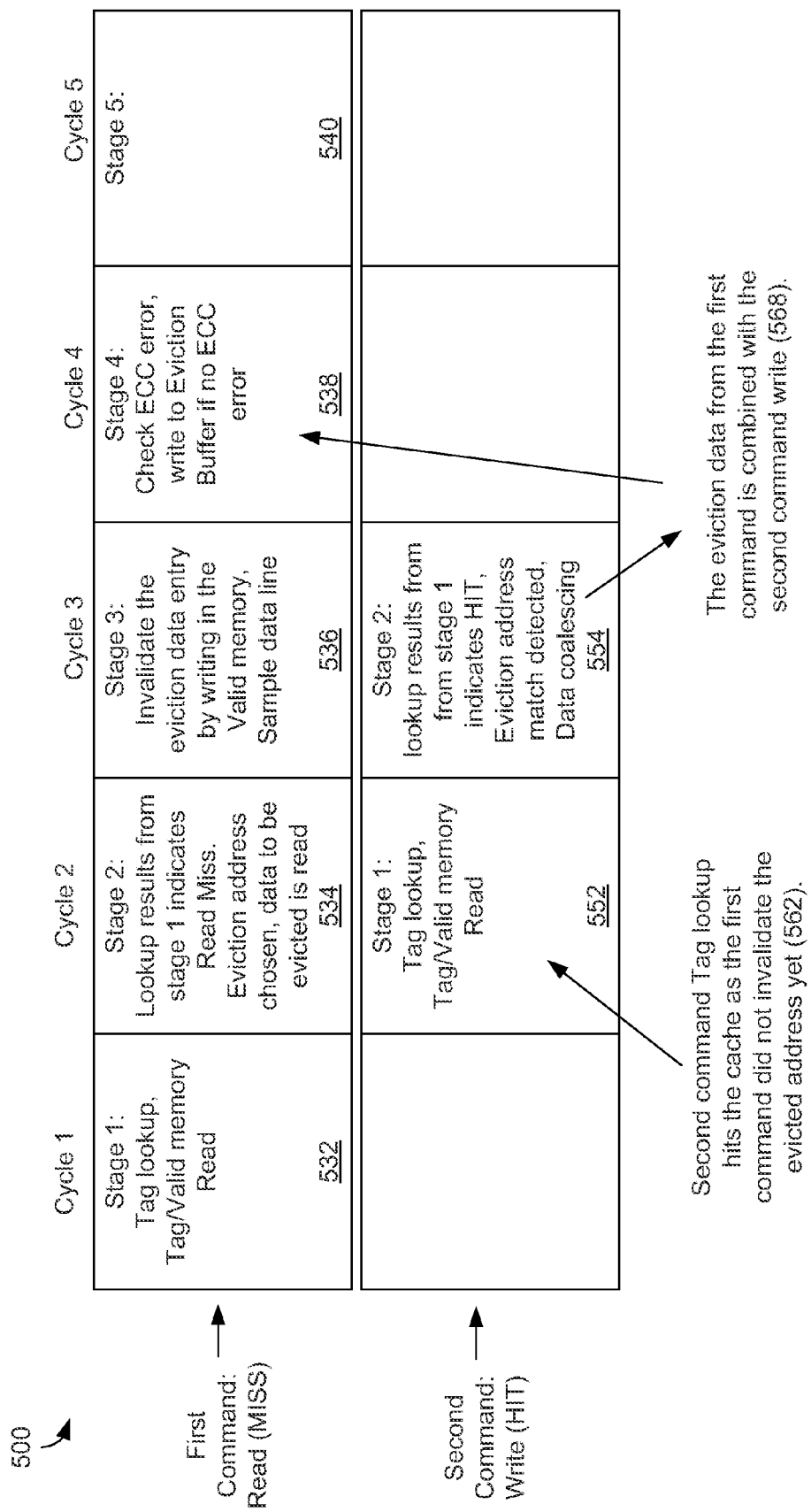
FIG. 5 illustrates processing of two concurrent cache commands by the command processing pipeline of FIG. 4, in accordance with an embodiment of the present invention.

FIG. 5 illustrates processing of two concurrent cache commands by the command processing pipeline 400 of FIG. 4, in accordance with an embodiment of the present invention. The two sets of cache data, and their respective cache commands, may be from the same processing core, or from different processing cores that share a cache. Referring to FIGS. 4 and 5, the first row of FIG. 5 illustrates processing of a read command that may enter the pipeline 400 during a first clock cycle (indicated by block 532 in FIG. 5). The first stage may perform an address lookup of the read command, and the read command may be determined as a miss by the second stage of the pipeline 400 during a second clock cycle. Accordingly, during the second clock cycle, an appropriate eviction address may be selected (indicated by block 534) using, for example, a random, a pseudo-random, or any other (e.g., first in-first out, eviction of least used data, etc.) suitable eviction policy. The pipeline 400 may choose to evict data bits that may be stored in, for example, Address A of the cache. As illustrated in FIG. 5, data associated with Address A (that is, data to be evicted, namely eviction data) may be read from the cache during the second clock cycle by stage 2 of the pipeline 400. In the third clock cycle, the third stage of the pipeline 400 may invalidate the eviction data entry (i.e., invalidate data associated with Address A) in the cache by updating the valid memory 160, and may also sample the eviction data read from stage 2 (indicated by block 536). That is, from third clock cycle onwards, the valid memory 160 may indicate the invalidity of the eviction data.

In an embodiment, during the fourth clock cycle, while processing the read miss command, the fourth stage of the pipeline may check ECC error of the eviction data that was read from Address A and sampled by previous stages of the pipeline 400. If no ECC error is found, the eviction data may be written to the eviction buffer 490.

In the meantime, during the second clock cycle, a write command (illustrated in the second row of FIG. 5) may also enter the command processing pipeline 400, as indicated by block 552 in FIG. 5. The write command may include "write data" (i.e., data that is to be written), and may be configured to write the write data in, for example, Address B of the cache. In an embodiment, the write command may be associated with the address of the data that is chosen for eviction (i.e., the eviction data). That is, Address A and Address B may be the same address. As discussed before, during the second clock cycle the eviction data has not yet been invalidated in the valid memory 160 (the invalidation may be carried out in the third clock cycle). Accordingly, the address lookup performed for the write command during the second clock cycle may result in a hit. Thus, during the third clock cycle, the second stage of the pipeline 400 may determine that the write command is a Write Hit command (indicated by block 554 in FIG. 5). In an embodiment, the second stage may also detect that the address associated with the write command (i.e., Address B) matches with the address of the data that is in the process of being evicted (i.e., Address A).

In an embodiment, the second stage of the pipeline, while processing the Write Hit command, may also write the write data to the eviction buffer 490 (instead of writing to Address B in the data memory 176 of the cache). Writing the write data to the eviction buffer 490, instead of writing the write data to the data memory 176 of the cache, may be in response to determining that the eviction address (e.g., Address A) matches with the address associated with the write command (e.g., Address B).

In an embodiment, as both the write data and the eviction data is written in the eviction buffer, the write data and the eviction data may be combined or coalesced in the eviction buffer 490. As the write data was originally meant to be written to the eviction address that originally included the eviction data, combining or coalescing the write data and the eviction data may ensure that the write operation performs its intended purpose (e.g., write the write data over the eviction data). In an embodiment, such combining or coalescing may include, for example, overwriting the eviction data with the write data, updating the eviction data with the write data, adding the write data to the write data, or any other appropriate type of combination based, for example, on the type of write command.

In an embodiment, data in the cache may be stored in a plurality of cache lines, and each cache line may store multiple bytes (e.g., 32 bytes) of data. In an embodiment, line eviction (i.e., eviction of data) may be done in a resolution of a half cache line. That is, the eviction data may include data included in half cache line or in a full cache line. A cache line may, for example, include 32 bytes of data, and the eviction may involve eviction of the lower 16 bytes (e.g., Byte 0 to Byte 15) of data (i.e., lower half of the cache line), the higher 16 bytes (e.g., Byte 15 to Byte 31) of data (i.e., upper half of the cache line), or the all the 32 bytes of data (i.e., full cache line). Irrespective of whether the upper half, lower half, or the full cache line is to be evicted, in an embodiment, the entire cache line may be written to the eviction buffer, with a byte enable flag indicating whether eviction data associated with the lower half, upper half, or the entire cache line in the eviction buffer is to be written to the external memory.

In an embodiment, when the eviction data involves only an upper half of a cache line and write data includes only a lower half of the cache line, the combining or coalescing in the eviction buffer 490 may include writing in the eviction buffer 490 the eviction data associated with the upper half of the cache line from the data memory 176 of the cache, and writing in the eviction buffer the write data associated with the lower half of the write cache line data. Subsequently, the entire cache line from the eviction buffer 490 may be written to the external memory.

In an embodiment, when the eviction data involves only a lower half of a cache line and write data includes only an upper half of the cache line, the combining or coalescing in the eviction buffer 490 may include writing in the eviction buffer 490 the eviction data associated with the lower half of the cache line from the data memory 176 of the cache, and writing in the eviction buffer the write data associated with the upper half of the write cache line data. Subsequently, the entire cache line from the eviction buffer 490 may be written to the external memory.

In another embodiment, when the eviction data involves the lower half of a cache line and write data also includes the lower half of the cache line, such combining or coalescing in the eviction buffer may include writing in the eviction buffer the write data associated with the upper half of the write cache line data (as the write data is more current or updated compared to the eviction data).

Figure 6:
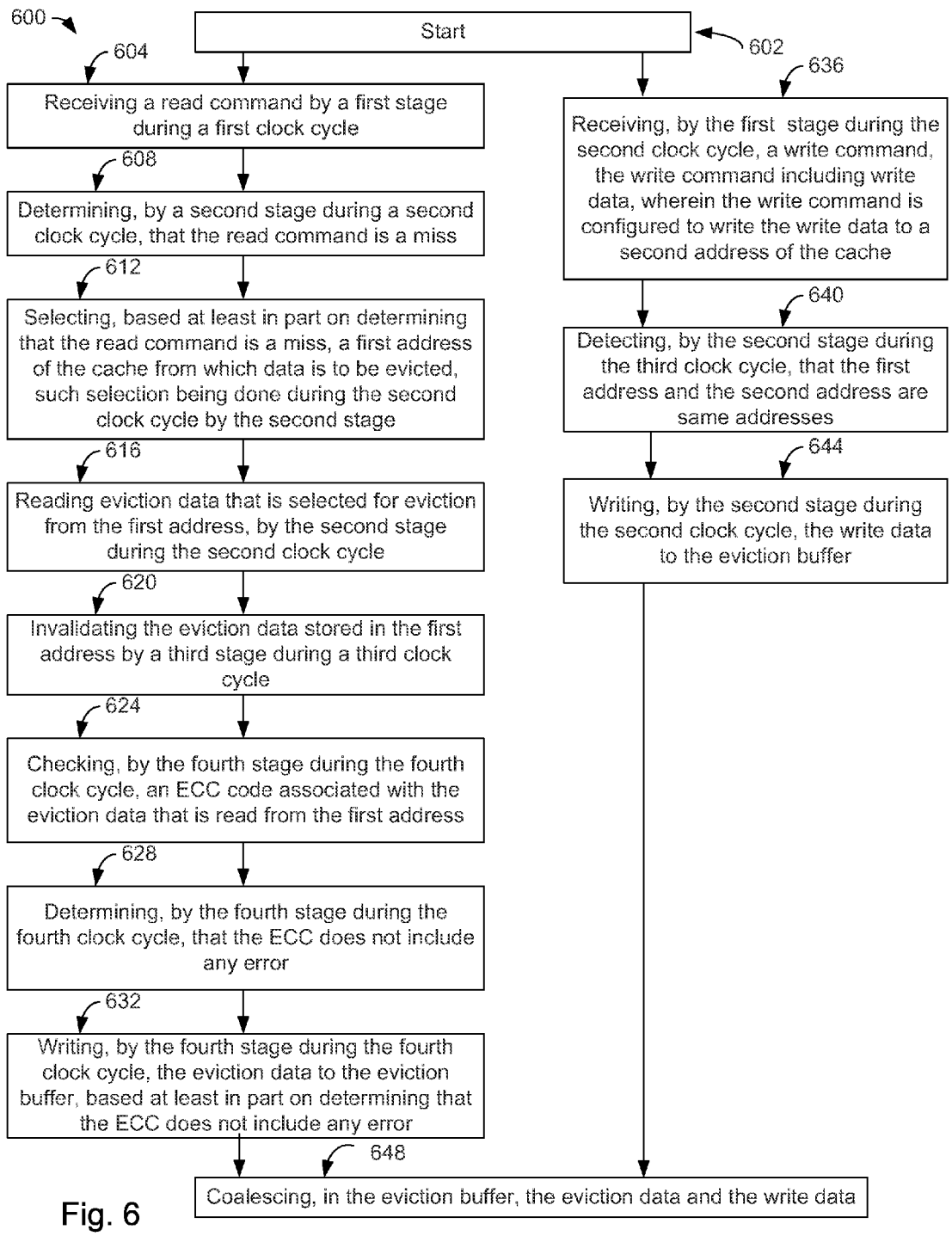
FIG. 6 illustrates an example method of processing of two concurrent cache commands by the command processing pipeline of FIG. 4, in accordance with an embodiment of the present invention.

FIG. 6 illustrates an example method 600 of processing of two concurrent cache commands by the command processing pipeline 400 of FIG. 4, in accordance with an embodiment of the present invention. The cache commands that are processed, and their respective data, may be from the same processing core, or from different processing cores that each share a cache. The method 600 may start at block 602. Referring to FIGS. 4, 5 and 6, the method 600 may include, at block 604, receiving a read command by the first stage during a first clock cycle (also illustrated in block 532 of FIG. 5). The method 600 may further include, at block 608, determining, by the second stage during a second clock cycle, that the read command is a miss (also illustrated in block 534 of FIG. 5). The method 600 may further include, at block 612, selecting, based at least in part on determining that the read command is a miss, a first address of the cache from which data is to be evicted, such selection being done during the second clock cycle by the second stage (also illustrated in block 534 of FIG. 5). The method 600 may further include, at block 616, reading eviction data that is selected for eviction from the first address, by the second stage during the second clock cycle (also illustrated in block 534 of FIG. 5).

The method 600 may further include, at block 620, invalidating the eviction data stored in the first address by a third stage during a third clock cycle (also illustrated in block 536 of FIG. 5). The method 600 may further include, at block 624, checking, by the fourth stage during the fourth clock cycle, an error ECC code associated with the eviction data that is read from the first address (also illustrated in block 538 of FIG. 5). In an embodiment, this operation may be optional, and checking the ECC may be skipped if, for example, an ECC check condition flag is disabled.

The method 600 may further include, at block 628, determining, by the fourth stage during the fourth clock cycle, that the ECC does not include any error. In case there is an ECC error (not illustrated in FIG. 6), the method may further include correcting the ECC error by the fifth stage during a fifth clock cycle, and the remaining operations of the method 600 may change accordingly.

The method 600 may further include, at block 632, writing, by the fourth stage during the fourth clock cycle, the eviction data to the eviction buffer 490, based at least in part on determining that the ECC does not include any error.

The method 600 may further include, at block 636, receiving, by the first stage during the second clock cycle, a write command, the write command including write data, wherein the write command may be configured to write the write data to a second address of the cache (also illustrated in block 552 of FIG. 5). In an embodiment, the second address may be the same as the first address. As previously discussed, eviction data entry may be invalidated during the third clock cycle. Accordingly, an address lookup performed on the write command during the second clock cycle may result in a write hit during the third clock cycle (also illustrated in block 554 of FIG. 5). The method 600 may further include, at block 640, detecting, by the second stage during the third clock cycle, that the first address and the second address are the same addresses (also illustrated in block 554 of FIG. 5). The method 600 may further include, at block 644, writing, by the second stage during the second clock cycle, the write data to the eviction buffer 490.

Once the eviction buffer 490 receives the eviction data and the write data, at block 648, the eviction buffer 490 may coalesce the eviction data and the write data.

Read after Read Command Pipelining

As previously discussed, processing a read miss command may include performing an address lookup (to determine if the command is a miss), choosing an eviction address, updating valid memory to indicate the invalidity of the eviction data, checking the eviction data for possible ECC errors (if, for example, an ECC correction condition is set), and writing the eviction data to the external memory.

In an embodiment, while processing a read miss command, once the cache has chosen an eviction address, the cache may take some time (e.g., one cycle) to invalidate the address of the eviction data in the valid memory, such that subsequent cache commands associated with the eviction address indicates a miss. However, there may be situations where a cache command (e.g., a second read command) associated with the address of the eviction data may enter the pipeline before the eviction address is invalidated. This may result in a hit for the second read command, even though data from the eviction address is going to be evicted to the external memory within the next few clock cycles.

Figure 7:
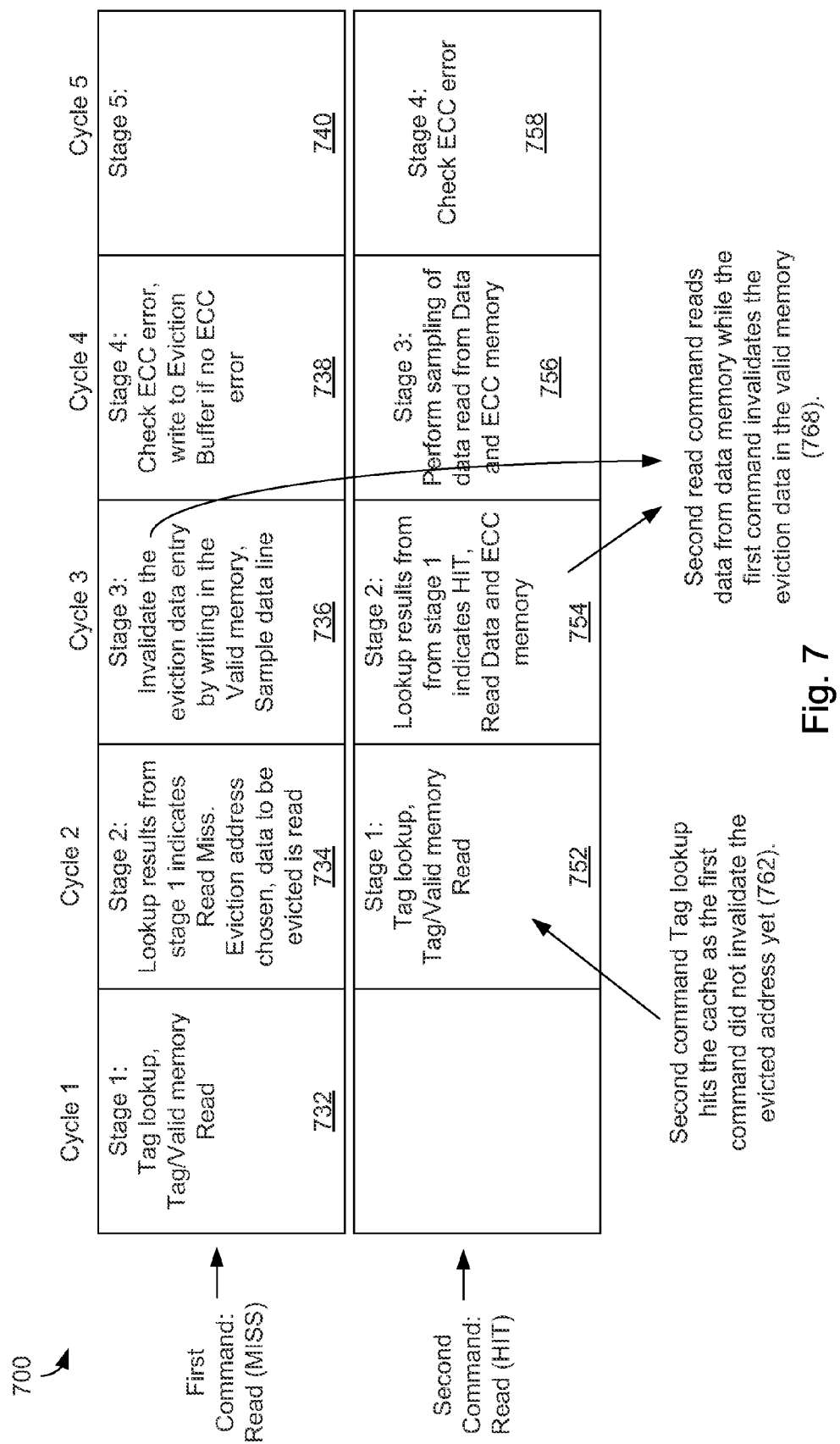
FIG. 7 illustrates processing of two concurrent cache commands by the command processing pipeline of FIG. 4, in accordance with an embodiment of the present invention.

FIG. 7 illustrates processing of two concurrent cache commands by the command processing pipeline 400 of FIG. 4, in accordance with an embodiment of the present invention. In an embodiment, the first cache command of FIG. 7 may be a Read miss command.

Processing of the first Read miss command (e.g., the first row of FIG. 7) may be at least partially similar to processing of the read command of FIG. 5. For example, the first stage of the pipeline may perform an address lookup of the read command received during the first clock cycle (block 732 of FIG. 7), and the read command may be determined as a miss by the second stage of the pipeline 400 during a second clock cycle (block 734). Accordingly, during the second clock cycle, an appropriate eviction address may be chosen (block 734). For example, the pipeline 400 may choose to evict data bits that may be stored in Address A of the cache. As illustrated in FIG. 7, data associated with Address A (e.g., eviction data or data to be evicted) may also be read from the cache during the second clock cycle by stage 2 of the pipeline 400. In the third clock cycle, the third stage of the pipeline 400 may invalidate the eviction data entry (i.e., invalidate data associated with Address A) in the cache valid memory 160, and may also sample the eviction data read from stage 2 (indicated by block 736). That is, from third clock cycle onwards, the valid memory 160 may indicate the invalidity of the eviction data associated with Address A. During the fourth clock cycle, the fourth stage may check the eviction data for possible ECC error (block 738). If no ECC error is detected, the fourth stage may write the eviction data to the eviction buffer 490 of pipeline 400. In case a pipeline without an eviction buffer is used, the fourth stage may write the eviction data directly to an external memory during the fourth clock cycle.

During the third clock cycle and while processing the first read command (block 736), the pipeline 400 may invalidate the cache entry associated with Address A by updating the status of the address location in the valid and/or tag memory. However, such invalidation and eviction may not result in replacing or erasing the eviction data from the eviction address. Rather, the eviction data in the cache is updated or replaced by new data fetched from an external memory at a later stage (not illustrated in FIG. 7), e.g., during a subsequent and separate cache command (e.g., a line fill update command). That is, even though the eviction data is written to the eviction buffer (and subsequently to the external memory) and the valid/tag memory is updated to indicate the invalidity of the eviction data, the eviction data still resides in the data memory 176 of the cache, until replaced by new data fetched from the external memory at a later time. Put differently, the eviction process merely writes the eviction data to the eviction buffer, and invalidates the eviction data entry in the valid/tag memory, but does not actually replace or erase (or actually evict) the eviction data from the eviction address of the cache. The erasure or replacement of the eviction data may be performed by a subsequent line fill update command.

Also, during the second clock cycle, the first stage may receive a second read command (illustrated in the second row of FIG. 7) configured to read data associated with Address A (i.e., the data which is to be evicted as a part of the first read command). As the address lookup of the second read command may be performed during the second clock cycle, i.e., before the eviction data associated with Address A is invalidated by the first read command, (the first read command invalidates the eviction data during the third clock cycle), the second read command may be determined to be a hit by stage 2 during the third clock cycle (illustrated by block 754). As previously discussed, although the valid memory may be updated to reflect the invalid status of the eviction data, the eviction data may still reside in the data memory 176 of the cache for at least a few clock cycles (e.g., until replaced by new data fetched from the external memory using a data fill update command). Accordingly, during the third clock cycle, the second stage may also read data from Address A as a part of processing the second read command (block 754). During the fourth cycle, data read from the data memory may be sampled by the third stage (block 756), and may be checked for ECC error during the fifth clock cycle by the fourth stage. If an ECC error is detected, ECC correction may be performed (not illustrated in FIG. 7) during a sixth clock cycle by the fifth stage of pipeline 400, thereby completing the second read command.

Thus, in an embodiment, the structure of the pipeline 400 may allow processing of the second read command, even though the data read by the second read command may be evicted by the first command. That is, the pipeline 400 may allow processing of two read commands received over two consecutive clock cycles, whether from the same processing core or from different processing cores sharing the cache, where the first read command is a read miss, and the second read command is a read hit and aims to read data that is evicted as a part of the first read command. Processing of the subsequent read command may begin with the cycle following address comparison of the first read command but prior to the first read command being fully processed. In a conventional cache without such a pipeline, by comparison, this may not be possible. For example, in conventional cache, the processing of the second read command may be stalled until the first command is fully processed, resulting in a miss for the second read command (as the address lookup of the second read command may be commenced only after updating the tag/valid memory about the invalid status of the eviction data by the first read command). This may decrease the throughput and speed of processing commands in the conventional caches.

Figure 8:
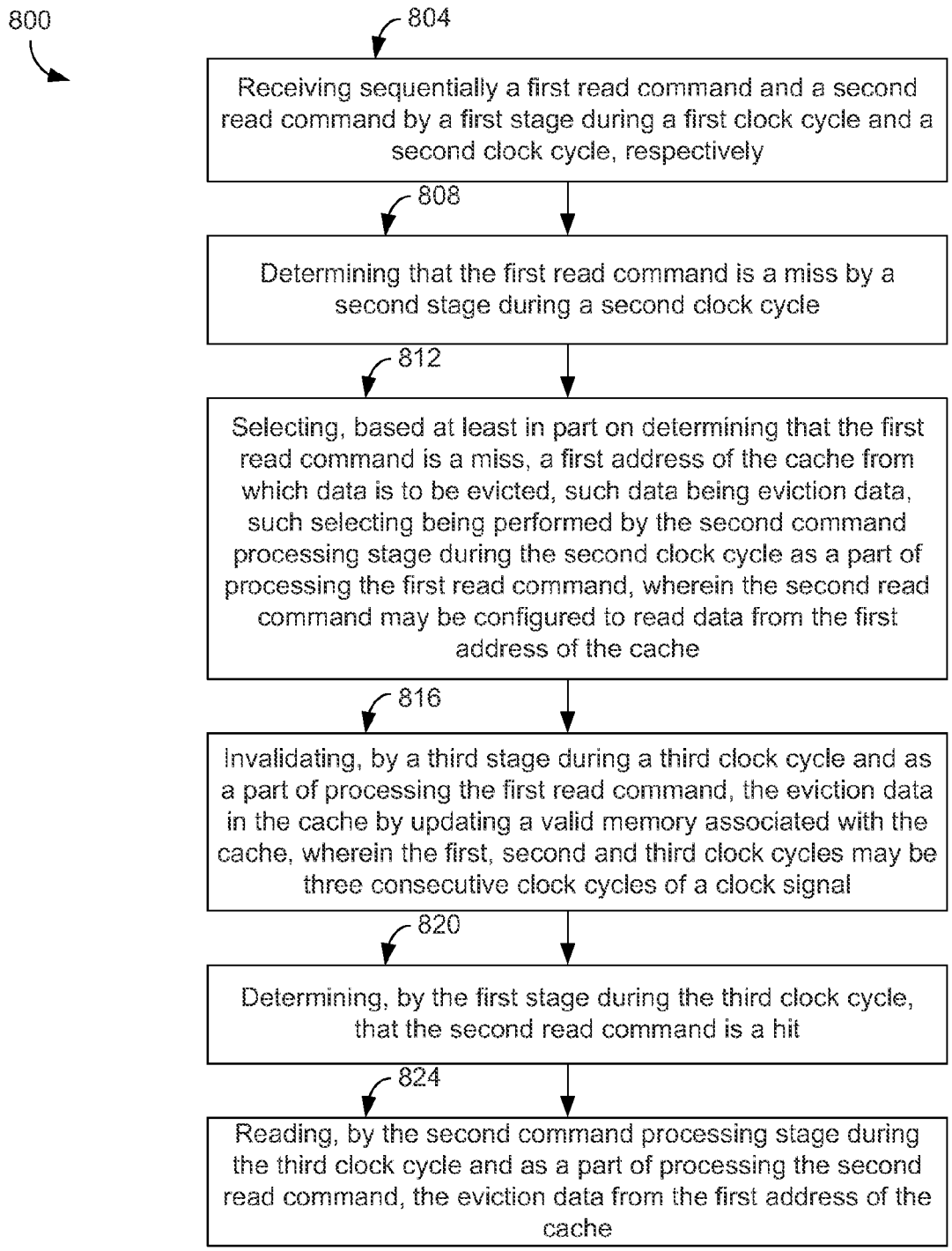
FIG. 8 illustrates another example method of processing of two concurrent cache commands by the command processing pipeline of FIG. 4, in accordance with an embodiment of the present invention.

FIG. 8 illustrates another example method 800 of processing of two concurrent cache commands by the command processing pipeline 400 of FIG. 4, in accordance with an embodiment of the present invention. The two cache commands may be from the same processing core or from different processing cores that share the cache. Referring to FIGS. 4, 7 and 8, the method 800 includes, at block 804, receiving, sequentially, a first read command and a second read command by a first stage during a first clock cycle and a second clock cycle, respectively (also illustrated in blocks 732 and 752, respectively, of FIG. 7). The method 800 may further include, at block 808, determining that the first read command is a miss by a second stage during a second clock cycle (also illustrated in block 734 of FIG. 7).

The method 800 may further include, at block 812, selecting, based at least in part on determining that the first read command is a miss, a first address of the cache from which data is to be evicted (block 734 of FIG. 7), such data being eviction data. The second read command may also be configured to read data from the first address of the cache. The selecting may be performed by the second command processing stage during the second clock cycle as a part of processing the first read command.

The method 800 may further include, at block 816, invalidating, by a third stage during a third clock cycle and as a part of processing the first read command, the eviction data in the cache by updating a valid memory associated with the cache (block 736 of FIG. 7), wherein the first, second and third clock cycles may be three consecutive clock cycles of a clock signal.

As the eviction data may be invalidated during the third clock cycle, an address lookup performed on the second read command (that is configured to read data from the first address) during the second clock cycle may result in a read hit during the third clock cycle (block 754 of FIG. 5). Thus, the method 800 may further include, at block 820, determining, by the first stage during the third clock cycle, that the second read command is a hit. The method 800 may further include, at block 824, reading, by the second command processing stage during the third clock cycle and as a part of processing the second read command, the eviction data from the first address of the cache. Thus, reading the eviction data (as a part of processing the second read command) from the first address of the cache may be performed substantially simultaneously with or after invalidating the eviction data at block 816.

Structure of the Command Processing Pipeline

A cache memory may be a multi-way cache, in which data in the cache may be stored in one of a plurality of ways (e.g., areas of sections) of the cache, as is well known to those skilled in the art. For example, a cache may be a four way cache, an eight way cache, a sixteen way cache, a thirty way cache, or a cache may include any other appropriate number of ways. Thus, for the purpose of this disclosure and unless otherwise mentioned, a "way" may indicate one of the sections or areas of a multi-way cache that includes a plurality of areas or sections, as will be readily understood by those skilled in the art.

In an embodiment, the valid memory, tag memory and/or dirty memory of the cache may be divided, for example, in sixteen parts for a sixteen way cache such that each way is associated with its individual tag memory, valid memory and/or dirty memory. In another embodiment, sixteen different tag memories, valid memories and/or dirty memories may also be present, each for a respective way.

Figure 9:
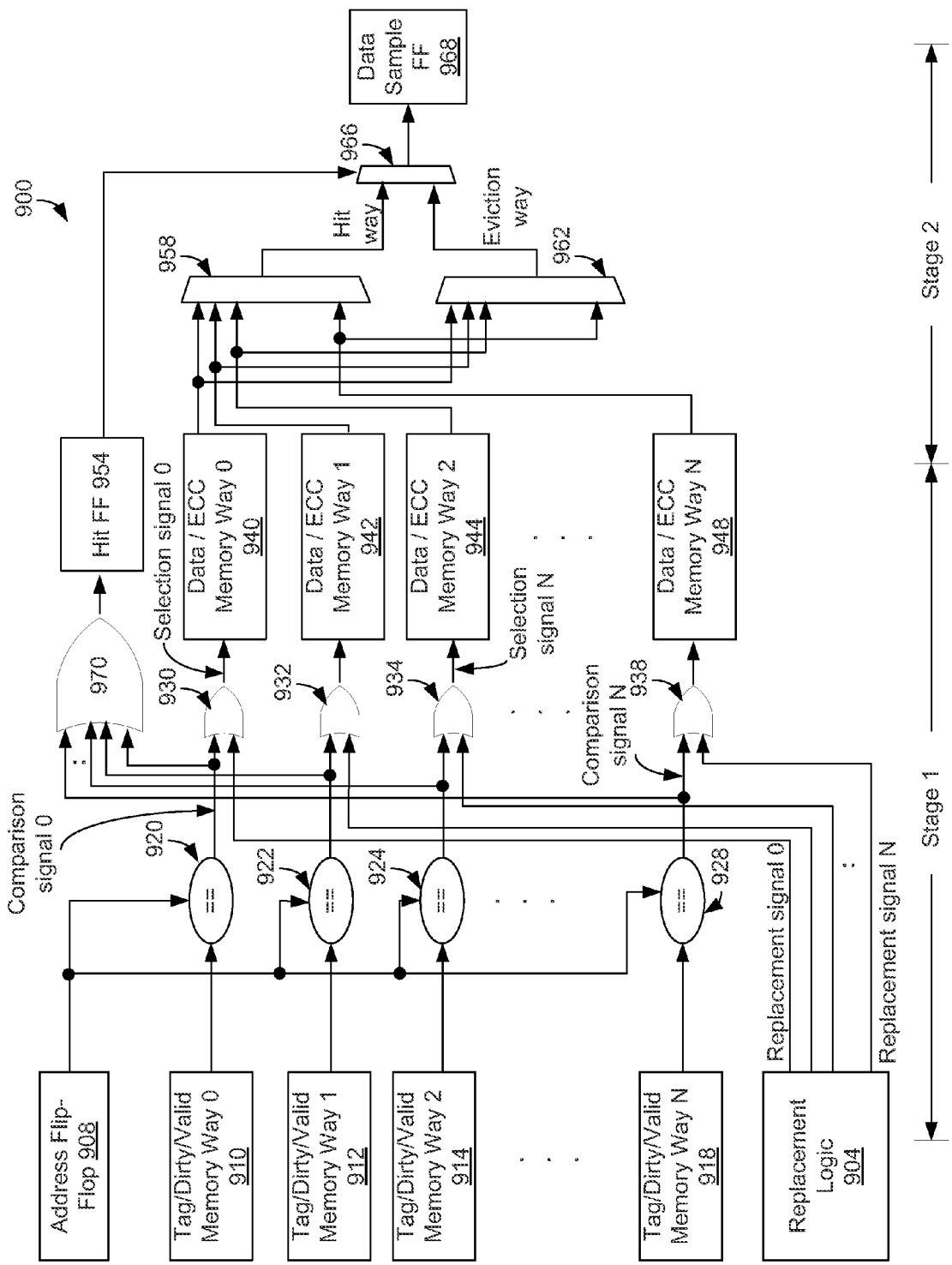
FIG. 9 schematically illustrates a portion of an example command processing pipeline that is configured to be operatively coupled to a cache, in accordance with an embodiment of the present invention.

FIG. 9 schematically illustrates a detailed architecture of a portion of an example command processing pipeline 900 that is configured to be operatively coupled to a cache, in accordance with an embodiment of the present invention. In an embodiment, the command processing pipeline 900 may be at least in part similar to the command processing pipelines 100 and/or 400 of FIGS. 1 and 4, respectively. In an embodiment, the cache with which the pipeline 900 is associated may be an N way cache (i.e., includes ways 0, 1, . . . , N), where N may be any appropriate number (e.g., 1, 2, 4, 8, 16, or the like).

In an embodiment, the pipeline 900 may be configured to process a series of cache commands, including a first cache command that may be associated with a first address of the cache.

In an embodiment, the pipeline 900 may be associated with N numbers of tag, dirty and/or valid memories 910, 912, 914, . . . , 918, where each tag, dirty and/or valid memory may be associated with a corresponding way (e.g., tag, dirty and/or valid memory 910 associated with way 0, tag, dirty and/or valid memory 912 associated with way 1, and so on).

FIG. 9 illustrates only the first two stages of the pipeline 900. In an embodiment, the first stage may include N comparison modules 920, 922, 924, . . . , 928, where each comparison module may be associated with a corresponding way (e.g., comparison module 920 associated with way 0, comparison module 922 associated with way 1, and so on). Each comparison module may be operatively coupled to a corresponding tag, dirty and/or valid memory. In an embodiment, each comparison module may perform an address lookup by comparing an address of the first cache command (e.g., the first address) with the associated tag, dirty and/or valid memory. The address lookup and comparison for individual comparison modules 920, . . . , 928 may be performed in parallel. For example, comparison module 920 may compare an address of the first cache command (received from an address flip-flop 908) with the associated tag, dirty and/or valid memory 910. Based on such comparisons, each comparison module 920-928 may output a corresponding comparison signal, wherein each comparison signal may be indicative of whether the corresponding way is a hit way or a miss way. For example, if the first cache command is a hit and the first address is associated with a first way, then the first way may be a hit way (and the rest of the ways may be a miss way). Thus, the first comparison signal (associated with the first address) may be high (indicating that the first way is the hit way), and the rest of the comparison signals may be low (indicating that the rest of the ways are not hit ways, i.e., rest of the ways are miss ways).

In case the first cache command is a miss (e.g., if none of the ways is found to be a hit way while performing the address lookup and comparison by the comparison modules 920-928), one or more data bits may be evicted from the cache to make space for new data to be fetched from an external memory, as previously discussed. In an embodiment, the first stage may further include replacement logic 904 configured to select a second address from which data is to be evicted if the first cache command is a miss. In an embodiment, selection of the eviction address may be performed using a suitable eviction policy, e.g., a random, a pseudo-random, or any other (e.g., first in-first out, eviction of least used data, etc.) suitable eviction policy. A way with which the second address is associated may be an eviction way. That is, data from the eviction way may be selected by the replacement logic 904 for possible eviction if the first command is a miss. The replacement logic 904 may be configured to output N replacement signals corresponding to the N ways, where each replacement signal may be indicative of whether the corresponding way is the eviction way. For example, if a second way is the eviction way, all but the second replacement signal may be low (e.g., have a value 0) and the second replacement signal may be high (e.g., have a value 1).

In an embodiment, the first stage may further include N logical OR gates 930, 932, 934, . . . , 938, where each logical OR gate may be associated with a corresponding way (e.g., OR gate 930 associated with way 0, OR gate 932 associated with way 1, and so on). Each OR gate may be operatively coupled to the corresponding comparison module and to the replacement logic 904 such that each OR gate receives the corresponding comparison signal and the corresponding replacement signal. Each OR gate may output a corresponding selection signal. Thus, each selection signal out put from one of OR gates 930-938 may be indicative of whether the corresponding way is the hit way and/or the eviction way. For example, a first selection signal (associated with the first way) may be high, if the first way is the hit way. Similarly, a second selection signal (associated with the second way) may be high, if the second way is the eviction way.

In an embodiment, output from each of the OR gates 930, 932, 934, . . . , 938 may be coupled to corresponding data/ECC memories 940, 942, 944, . . . , 948. Each data/ECC memory may be associated with a corresponding way (e.g., data/ECC 940 associated with way 0, data/ECC 942 associated with way 1, and so on). In an embodiment, in case the hit way and the eviction way are same and/or in case the first cache command is not a hit command, selection signals to only one data/ECC memory may be high. In case the first command is a hit command, and if the hit and eviction ways are different, then selection signals to only two of the data/ECC memories may be high. In an embodiment, data may be accessed from one or both data/ECC memories for which the corresponding selection signals are high. For example, if the first cache command is high, and if the first way is the hit way and the second way is the eviction way, then first and second selection signals may be high. In an embodiment, data/ECC may be accessed from those data/ECC memories that have a high selection signal. For example, if the first and second selection signals are high, data may be accessed and read from the first and second data/ECC memories. Data may not be accessed or read from any other data/ECC memories of FIG. 9.

In an embodiment, the pipeline 900 may further include a first multiplexer 958 and a second multiplexer 962. Each of the first and second multiplexers may be operatively coupled to each of the N data/ECC memories. The first multiplexer 958 may be configured to output data read from the data/ECC memory that is associated with the hit way. For example, the first multiplexer 958 may output data associated with the first data/ECC memory, if the first way is the hit way. In an embodiment, although not illustrated in FIG. 9, the first multiplexer 958 may receive a selection signal (e.g., from the OR gates 930-938, from OR gate 970, from a separate OR gate that compares all the comparison signals, or the like) that indicates which one of the ways is the hit way, such that data read from the data/ECC memory that is associated with the hit way may be output by the first multiplexer 958. The second multiplexer 962 may be configured to output data read from the data/ECC memory that is associated with the eviction way. For example, the second multiplexer 962 may output data associated with the second data/ECC memory, if the second way is the eviction way. In an embodiment, although not illustrated in FIG. 9, the second multiplexer 962 may receive a selection signal (e.g., from the replacement logic 904) that indicates which one of the ways is the potential eviction way, such that data read from the data/ECC memory that is associated with the potential eviction way may be output by the second multiplexer 962.

In an embodiment, the pipeline 900 may further include an additional logical OR gate 970 which may receive all the N comparison signals, and indicate if the first command is a hit or a miss. For example, all N comparison signals having a low value may result in an output of OR gate 970 having a low value, which may indicate that none of the N ways is a hit way, i.e., the first command is not a hit (i.e., the first command is a miss). On the other hand, any one of the N comparison signals having a high value may result in the output of OR gate 970 having a high value, which may indicate that there is one way which is a hit way, i.e., the first cache command is a hit. A hit flip-flop 954 may be operatively coupled to the OR gate 954, and may receive a signal from the OR gate 970 that indicates whether the first cache command is a hit or a miss.

In an embodiment, the pipeline 900 may further include a third multiplexer 966 that may be operatively coupled to the first multiplexer 958 and the second multiplexer 962. The third multiplexer 966 may be operatively coupled to the flip-flop 954 and configured to receive a signal from the flip-flop 954 that indicates whether the first cache command is a hit or a miss. The third multiplexer 966 may output signal from either the first multiplexer 958 or the second multiplexer 962 based on whether the first cache command is a hit or a miss. For example, the third multiplexer 966 may output data from the first multiplexer 958 (i.e., data from the first data/ECC memory) if the first cache command is a hit, and output data from the second multiplexer 962 (i.e., data from the second data/ECC memory) if the first cache command is a miss. The output of the third multiplexer 966 may be received by the third stage of the pipeline 900 (e.g., a data sample flip-flop 968) for further processing. Thus, the third stage may receive hit data (from the first data/ECC memory) in case the first command is a hit, and the third stage may receive eviction data (from the second data/ECC memory) in case the first command is a miss.

Processing each comparison signal and the corresponding replacement signal using a corresponding OR gate (i.e., each of the OR gates 930-938 receives a limited number (e.g., two) of signals) ensures fast processing of the comparison and replacement signals, such that all operations of the first stage may be completed with a relatively short amount of time (e.g., within one clock cycle). In contrast, in a conventional cache, a single OR gate may be used to compare all the comparison signals, leading to a relatively longer time to process the comparison signals. Also, in a conventional cache, the timing required to process the comparison signals increases with an increase in the number of ways. Thus, using multiple OR gates (corresponding to each way) in parallel in FIG. 9 may help in reducing or eliminating frequency reducing bottlenecks present in conventional caches. Even though the OR gate 970 in FIG. 9 may perform an OR operation for comparison signals of all the N ways, time taken to perform the OR operations by the OR gate 970 may not be very critical (as the result of the OR gate 970's calculation is not used immediately, and used only in the next stage after the appropriate Data/ECC memories have been accessed). Thus, using a single OR gate 970 in FIG. 9 for comparing all N comparison signals may not adversely affect the speed of the pipeline 900.

Parallel processing (e.g., performing address lookup by comparison modules 920-928, performing the OR operations by OR gates 930-938, accessing data/ECC memories, etc. in parallel) for various ways in the first and second stages in FIG. 9 ensures high speed of operation, such that each stage may process a cache command within a single clock cycle.

The structure of the various stages of the pipeline in FIG. 9 may allow sequential processing of two cache commands received during two consecutive clock cycles. That is, once the first stage processes a first command during a first cycle, a second command may enter the pipeline and may be processed by the first stage during a second cycle substantially simultaneously with the second stage processing the first command, where the first and second clock cycles may be two consecutive clock cycles. This may be possible because the first two stages of the pipeline accesses mutually exclusive cache resources and operations of the two stages are independent, as illustrated in FIG. 9. That is, intake of the second command during the second clock cycle may be independent of the result of the address lookup of the first command (i.e., whether the first command is a hit or a miss) performed during the first clock cycle.

Figure 10:
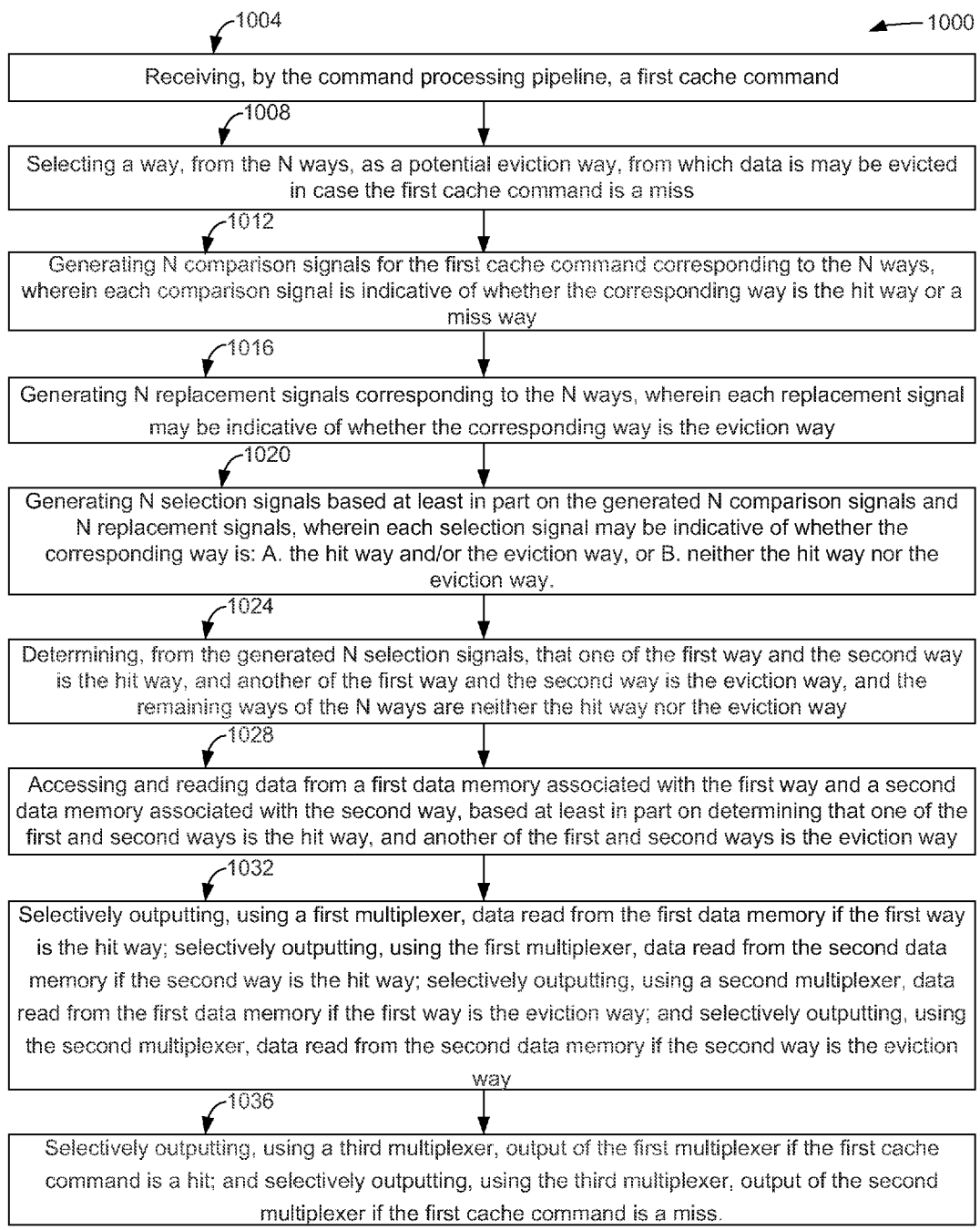
FIG. 10 illustrates an example method of operating the command processing pipeline of FIG. 9, in accordance with an embodiment of the present invention.

FIG. 10 illustrates an example method 1000 of operating the command processing pipeline 900 of FIG. 9, in accordance with an embodiment of the present invention. Referring to FIGS. 9 and 10, the method 1000 includes, at block 1004, receiving, by the command processing pipeline 900 (e.g., by the first stage of the pipeline 900), a first cache command. The method 1000 may further include, at block 1008, selecting a way, from the N ways of the N-way cache, as a potential eviction way, from which data may be evicted in case the first cache command is a miss. Such selection may be performed by replacement logic 904.

In one embodiment, the method 1000 may further include, at block 1012, generating N comparison signals for the first cache command corresponding to the N ways, wherein each comparison signal is indicative of whether the corresponding way is the hit way or a miss way. Comparison modules 920-928 may, in parallel, generate the corresponding comparison signals. For each of the N ways, a respective comparison module may compare an input from the corresponding tag, dirty and/or valid memory with a first address associated with the first cache command, and generating the corresponding comparison signal.

The method 1000 may further include, at block 1016, generating N replacement signals (e.g., by the replacement logic 904) corresponding to the N ways, wherein each replacement signal may be indicative of whether the corresponding way is the eviction way. In one embodiment, the operations of blocks 1012 and 1016 may be performed substantially simultaneously (e.g., during the same clock cycle).

The method 1000 may further include, at block 1020, generating N selection signals (e.g., by corresponding N OR gates 930-938) based at least in part on the generated N comparison signals and N replacement signals, wherein each selection signal may be indicative of whether the corresponding way is: A. the hit way and/or the eviction way, or B. neither the hit way nor the eviction way. For example, selection signal 0 (i.e., output of OR gate 930) may indicate that way 0 is the hit way and/or the eviction way (based on detecting that one or both of the comparison signal 0 and replacement signal 0 are high), whereas selection signal N (i.e., output of OR gate 938) may indicate that way N is neither the hit way nor the eviction way (based on detecting that none of the comparison signal N and replacement signal N is high).

The method 1000 may include, at block 1024, determining, from the generated N selection signals, that one of the first way and the second way is the hit way, and another of the first way and the second way is the eviction way, and the remaining ways of the N ways are neither the hit way nor the eviction way. For example, selection signal 0 and selection signal 1 may be high, and the rest of the selection signals may be low, indicating that one of way 0 and way 1 is the hit way, and another of way 0 and way 1 is the eviction way, and the remaining ways of the N ways are neither the hit way nor the eviction way. Although not illustrated in FIG. 10, there may also be situations when the potential eviction way and the hit way are the same way, and in that case, only one selection signal may indicate that the corresponding way is a hit and/or eviction way.

The method 1000 may further include, at block 1028, accessing and reading data from a first data memory associated with the first way and a second data memory associated with the second way, based at least in part on determining that one of the first and second ways is the hit way, and another of the first and second ways is the eviction way. For example, if selection signals 0 and 1 are high, then data/ECC memories 940 and 942 for ways 0 and 1 may be accessed and read.

The method 1000 may further include, at block 1032, selectively outputting, using a first multiplexer (e.g., multiplexer 958), data read from the first data memory if the first way is the hit way; selectively outputting, using the first multiplexer, data read from the second data memory if the second way is the hit way; selectively outputting, using a second multiplexer (e.g., multiplexer 962), data read from the first data memory if the first way is the eviction way; and selectively outputting, using the second multiplexer, data read from the second data memory if the second way is the eviction way.

The method 1000 may further include, at block 1036, selectively outputting, using a third multiplexer (e.g., multiplexer 966), output of the first multiplexer if the first cache command is a hit; and selectively outputting, using the third multiplexer, output of the second multiplexer if the first cache command is a miss.

Figure 11:
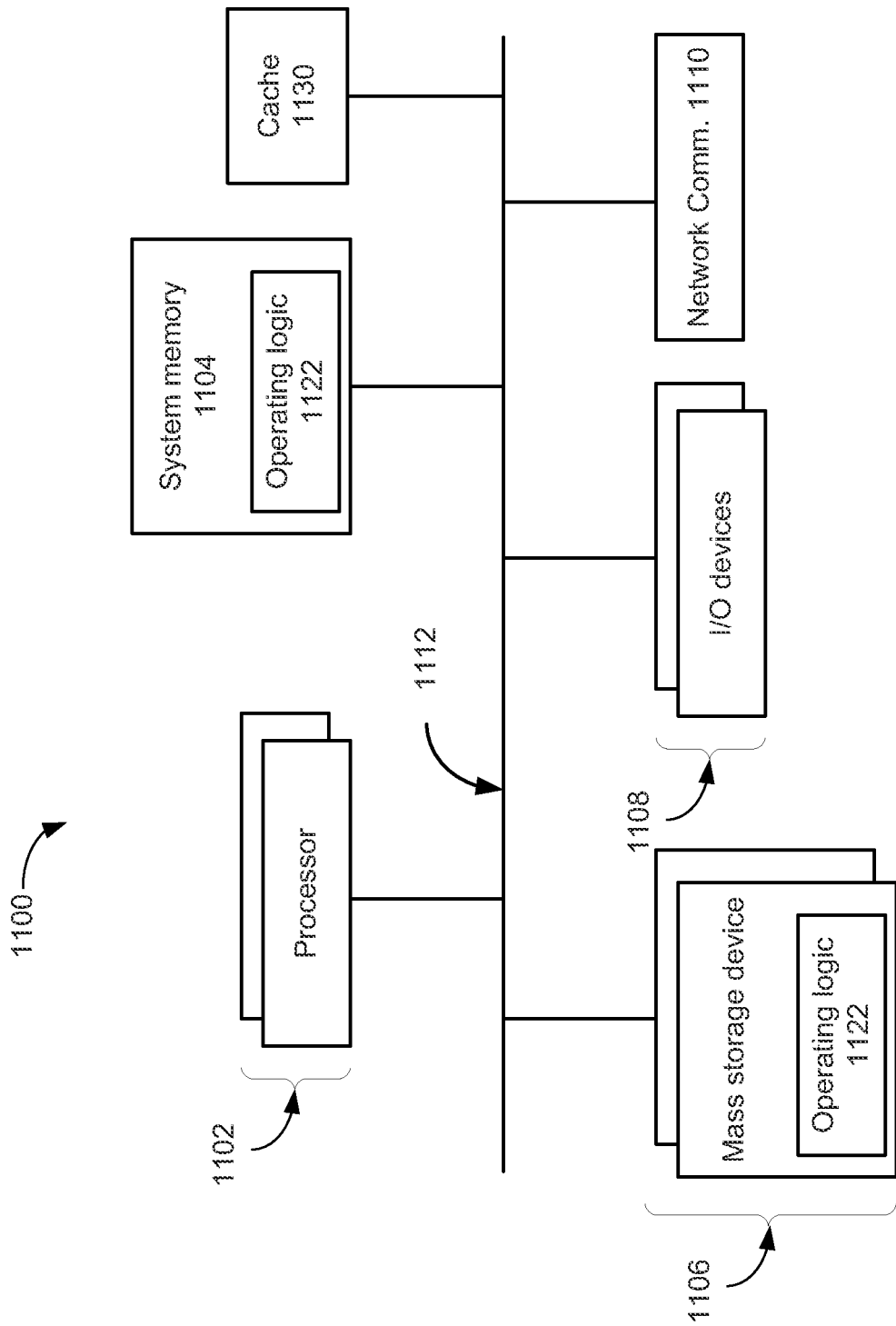
FIG. 11 is a simplified block diagram of a system in which embodiments of the present invention may be implemented.

FIG. 11 is a simplified block diagram of a system in which embodiments of the present invention may be implemented. As illustrated, system 1100 includes one or more processors or processor cores 1102, and system memory 1104. For the purpose of this application, including the claims, the terms "processor" and "processor cores" may be considered synonymous, unless the context clearly requires otherwise. Additionally, system 1100 includes mass storage devices 906 (such as diskette, hard drive, compact disc read only memory (CDROM) and so forth), input/output devices 1108 (such as a display to render visual manifestation, a keyboard, a cursor control, and so forth) and communication interfaces 1110 (such as network interface cards, modems and so forth). The elements of FIG. 11 may be operatively coupled to each other via system bus 1112, which represents one or more buses. In the case of multiple buses, they may be bridged by one or more bus bridges (not illustrated).

Each of these elements performs typical functions. For example, system memory 1104 and mass storage 1106 may be employed to store a working copy and a permanent copy of the programming instructions implementing all or a portion of earlier described functions, herein collectively denoted as 1122. The instructions 1122 may be assembler instructions supported by processor(s) 1102 or instructions that can be compiled from high level languages, such as C.

The permanent copy of the programming instructions may be placed into permanent storage 1106 in the factory, or in the field, through, for example, a distribution medium (not shown), such as a compact disc (CD), or through communication interface 1110 (from a distribution server (not shown)). That is, one or more distribution media having instructions 1122 may be employed to distribute the instructions 1122 and program various computing devices.

In an embodiment, the system 1100 may include a cache 1130. The cache 1130 may be, for example, a level 2 (L2) cache and/or may provide shared access to one or more of the processors 1102. Although not illustrated in FIG. 11, in an embodiment, the access to the cache 1130 may be through a command processing pipeline, e.g., pipeline 100, 400 and/or 900 of FIGS. 1, 4 and/or 9. Although not illustrated, one or more operations of the cache 1130 and/or the associated pipeline may be controlled by a suitable cache controller. In an embodiment, the cache 1130 may be used to store or cache data from the system memory 1104. In an embodiment, the system memory 1104, operating logic 1122 and/or the storage device 1106 may include instructions necessary to operate the cache 1130, the cache controller, and/or the associated command processing pipeline.

In embodiments of the present invention, an article of manufacture (not illustrated) may be employed to implement one or more methods as disclosed herein. For example, in example embodiments, an article of manufacture may comprise a storage medium and a plurality of programming instructions stored in the storage medium and adapted to program computing device to configure the computing device to operate a command processing pipeline operatively coupled to the cache 1130.

Although specific embodiments have been illustrated and described herein, it will be appreciated by those of ordinary skill in the art and others, that a wide variety of alternate and/or equivalent implementations may be substituted for the specific embodiment illustrated and described without departing from the scope of the present invention. This present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. This application is intended to cover any adaptations or variations of the embodiment discussed herein. Therefore, it is manifested and intended that the invention be limited only by the claims and the equivalents thereof.

What is claimed is:

1. A method comprising:
receiving, by a command processing pipeline coupled to a cache, a cache command; and
irrespective of whether the cache command is a hit or a miss, accessing and reading eviction data from the cache, wherein the eviction data represents data that is to be evicted from the cache if the cache command is a miss.

2. The method of claim 1, further comprising:
determining that the cache command is a hit; and
based on determining that the cache command is a hit:
accessing and reading read data from an address of the cache, wherein the address is associated with the cache command,
ignoring the eviction data, and
using the read data for further processing.

3. The method of claim 1, further comprising:
determining that the cache command is a miss; and
based on determining that the cache command is a miss, using the eviction data for further processing.

4. The method of claim 1, further comprising:
determining whether the cache command is a hit or a miss; and
based on determining whether the cache command is a hit or a miss, selectively using the eviction data for further processing.

5. The method of claim 1, wherein the cache is a N-way cache, wherein a way of the N ways of the N-way cache with which an address of the cache command matches is a hit way for the cache command if the cache command is a hit, wherein the method further comprises:
selecting an eviction way from the N ways, wherein the eviction way is a way of the N ways from which the eviction data is to be evicted if the first cache command is a miss; and
generating, based at least in part on the received cache command, N selection signals corresponding to the N ways, wherein a selection signal of the N selection signals is asserted if a corresponding way of the N ways is one or more both (i) the hit way and (ii) the eviction way.

6. The method of claim 5, further comprising:
determining that the cache command is a hit;
determining, from the N selection signals, that (i) one of a first way and a second way of the N ways is the hit way, and (ii) another of the first way and the second way is the eviction way; and
accessing and reading data from a first data memory associated with the first way and a second data memory associated with the second way, based at least in part on determining that (i) one of a first way and a second way of the N ways is the hit way, and (ii) another of the first way and the second way is the eviction way.

7. The method of claim 6, further comprising:
selectively outputting, using a first multiplexer operatively coupled to each of the N data memories, data read from the first data memory if the first way is the hit way;
selectively outputting, using the first multiplexer, data read from the second data memory if the second way is the hit way;
selectively outputting, using a second multiplexer operatively coupled to each of the N data memories, data read from the first data memory if the first way is the eviction way; and
selectively outputting, using the second multiplexer, data read from the second data memory if the second way is the eviction way.

8. The method of claim 7, further comprising:
based on determining that the cache command is a hit, selectively outputting, using a third multiplexer operatively coupled to the first and second multiplexers, output of the first multiplexer.

9. The method of claim 5, further comprising:
determining, from the N selection signals, that a first way of the N ways is one or both (i) the hit way, and (ii) the eviction way;
based on determining that the first way of the N ways is one or more both (i) the hit way, and (ii) the eviction way, selectively outputting, using a first multiplexer operatively coupled to each of the N data memories, read data from the first data memory if the cache command is a hit;
based on determining that the first way of the N ways is one or more both (i) the hit way, and (ii) the eviction way, selectively outputting, using a second multiplexer operatively coupled to each of the N data memories, eviction data read from the first data memory;
if the cache command is a hit, selectively outputting, using a third multiplexer operatively coupled to the first and second multiplexers, output of the first multiplexer; and
if the cache command is a miss, selectively outputting, using the third multiplexer, output of the second multiplexer.

10. A system on chip (SOC) comprising:
a cache; and
a command processing pipeline operatively coupled to the cache, the command processing pipeline comprising:
a first command processing stage configured to (i) receive a cache command, and (ii) irrespective of whether the cache command is a hit or a miss, access eviction data from the cache, wherein the eviction data represents data that is to be evicted from the cache if the cache command is a miss.

11. The SOC of claim 10, wherein the command processing pipeline further comprises:
a second command processing stage configured to (i) determine whether the cache command is a hit or a miss, and (ii) based on determining whether the cache command is a hit or a miss, selectively output the eviction data.

12. The SOC of claim 11, wherein if the cache command is a miss, the second command processing stage is configured to output the eviction data.

13. The SOC of claim 11, wherein if the cache command is a hit:
the first command processing stage is further configured to access read data from an address of the cache, wherein the address of the cache is associated with the cache command; and the second command processing stage is further configured to (i) output the read data and (ii) ignore the eviction data.

14. The SOC of claim 11, wherein the second command processing stage further comprises:
a multiplexer configured to output, based on whether the cache command is a hit or a miss, one of (i) the eviction data and (ii) read data from an address of the cache, wherein the address of the cache is associated with the cache command.

15. The SOC of claim 11, wherein the cache is an N-way cache, wherein a way of the N ways of the cache with which an address of a cache command matches is a hit way for the cache command in case the cache command is a hit, and the first command processing stage is further configured to:
select a way, from the N ways, as an eviction way, wherein the eviction way stores the eviction data; and
generate, based at least in part on the received cache command, N selection signals corresponding to the N ways, wherein a selection signal of the N selection signals is asserted if a corresponding way of the N ways is one or more both (i) the hit way and (ii) the eviction way.

16. The SOC of claim 10, further comprising:
a plurality of processing cores, wherein the cache is a shared cache and is configured to be accessed by one or more of the plurality of processing cores.

17. A system on chip (SOC) comprising:
a plurality of processing cores;
a shared cache configured to be accessed by one or more of the plurality of processing cores; and
a command processing pipeline operatively coupled to the cache and configured to process a cache command, wherein the command processing pipeline comprises:
a first stage configured to (i) receive the cache command, and (ii) transmit information to a second stage of the command processing pipeline based on processing the cache command, and
the second stage configured to selectively use the information received from the first stage to process the cache command.

18. The SOC of claim 17, wherein the second stage further configured to selectively use the information, based on whether the cache command is a hit or a miss.

19. The SOC of claim 17, wherein the information comprises a first subset of information, wherein the second stage is further configured to (i) use the first subset of information if the cache command is a miss, and (ii) ignore the first subset of information if the cache command is a hit.

20. The SOC of claim 17, wherein:
the information comprises a first subset of information;
if the cache command is a hit, the first stage is further configured to include a second subset of information in the information; and
the second stage is further configured to (i) use the first subset of information if the cache command is a miss, and (ii) use the second subset of information if the cache command is a hit.

21. The SOC of claim 20, wherein the first subset of information comprises eviction data that is to be evicted from the cache if the cache command is a miss, and the second subset of information comprises read data from the cache if the cache command is a hit.

* * * * *